United States Patent
Choi et al.

(10) Patent No.: US 10,524,298 B2
(45) Date of Patent: Dec. 31, 2019

(54) METHOD AND APPARATUS FOR SENDING AND RECEIVING DATA ON BLUETOOTH

(71) Applicant: LG ELECTRONICS INC., Seoul (KR)

(72) Inventors: Jingu Choi, Seoul (KR); Joonkie Kim, Seoul (KR); Younghun Nam, Seoul (KR); Jangwoong Park, Seoul (KR); Minsoo Lee, Seoul (KR); Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/572,284

(22) PCT Filed: May 4, 2016

(86) PCT No.: PCT/KR2016/004768
§ 371 (c)(1),
(2) Date: Nov. 7, 2017

(87) PCT Pub. No.: WO2016/178542
PCT Pub. Date: Nov. 10, 2016

(65) Prior Publication Data
US 2018/0295660 A1 Oct. 11, 2018

Related U.S. Application Data

(60) Provisional application No. 62/158,060, filed on May 7, 2015.

(51) Int. Cl.
*H04W 8/00* (2009.01)
*H04W 76/10* (2018.01)
(Continued)

(52) U.S. Cl.
CPC ........... *H04W 76/14* (2018.02); *H04W 8/005* (2013.01); *H04W 76/10* (2018.02); *H04W 92/18* (2013.01)

(58) Field of Classification Search
CPC ...... H04W 8/005; H04W 76/14; H04W 92/18
See application file for complete search history.

(56) References Cited

U.S. PATENT DOCUMENTS

2009/0055516 A1 * 2/2009 Zhodzishsky ........... G06F 21/85
709/220
2009/0234728 A1 9/2009 Willuns et al.
(Continued)

FOREIGN PATENT DOCUMENTS

KR 10-2013-0006731 A 1/2013

*Primary Examiner* — Nhan T Le
(74) *Attorney, Agent, or Firm* — Birch, Stewart, Kolasch & Birch, LLP

(57) ABSTRACT

The present invention relates to a method and apparatus for a device to set advertising messages on Bluetooth LE (Low Energy), wherein: a gostof the device transmits to a controller of the device a first parameter-setting command for setting parameters of two or more advertising messages, and receives, as a response to the parameter-setting command from the controller, a first completion command indicating that the parameter setting has been completed; the host transmits to the controller a first data-setting command for setting first data including the two or more advertising messages, and receives, as a response to the data-setting command from the controller, a second completion command indicating that the data setting has been completed; and the host transmits to the controller a first instruction command instructing transmission of the two or more advertising messages.

9 Claims, 20 Drawing Sheets

(51) Int. Cl.
*H04W 76/14* (2018.01)
*H04W 92/18* (2009.01)
*H04W 4/00* (2018.01)

(56) References Cited

U.S. PATENT DOCUMENTS

| | | | |
|---|---|---|---|
| 2011/0124297 A1* | 5/2011 | Son | H04L 69/28 455/68 |
| 2013/0040573 A1* | 2/2013 | Hillyard | H04W 8/005 455/41.2 |
| 2013/0089080 A1* | 4/2013 | Singer | G06F 13/385 370/338 |
| 2013/0090061 A1 | 4/2013 | Linde | |
| 2013/0109323 A1 | 5/2013 | Ruutu et al. | |
| 2014/0307600 A1* | 10/2014 | Dumitrescu | H04W 52/0245 370/311 |
| 2014/0355517 A1 | 12/2014 | Reunamaki et al. | |
| 2014/0378064 A1* | 12/2014 | Tsaur | H04W 4/008 455/41.3 |
| 2015/0133054 A1* | 5/2015 | Chen | H04W 74/002 455/41.2 |
| 2016/0099936 A1* | 4/2016 | Enke | H04L 63/0428 726/7 |
| 2016/0249292 A1* | 8/2016 | Viswanadham | H04L 12/1886 |
| 2016/0366718 A1* | 12/2016 | Sadeghi | H04W 76/14 |
| 2017/0201931 A1* | 7/2017 | Swanzey | H04W 76/10 |

\* cited by examiner (a)

(b)

METHOD AND APPARATUS FOR SENDING AND RECEIVING DATA ON BLUETOOTH

CROSS REFERENCE TO RELATED APPLICATIONS

This application is the National Phase of PCT International Application No. PCT/KR2016/004768, filed on May 4, 2016, which claims priority under 35 U.S.C. 119(e) to U.S. Provisional Application No. 62/158,060, filed on May 7, 2015, all of which are hereby expressly incorporated by reference into the present application.

TECHNICAL FIELD

The present invention relates to a method and an apparatus for sending and receiving data by using Bluetooth which is a short-range technology of a wireless communication system, and particularly, to a method and an apparatus for sending and receiving data by setting a parameter for transmitting a message in a Bluetooth low energy technology.

BACKGROUND ART

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

The Bluetooth LE can transmit information of various services that a device can provide to neighboring devices through an advertisement packet, a scan response message, and the like.

However, in the case of packets such as the advertising packet, the scan response message, and the like, information, which may be transmitted at one time, is limited due to a limitation of a packet size. In addition, an "advertiser setting procedure" needs to be performed, which a procedure for setting an advertising message in order to make information related with the service be included in the advertising packet.

However, in the case of a device capable of providing various services, it is necessary to repeatedly perform the "advertiser setting procedure" as many as the services in order to transfer multiple service information supported by the device to the neighboring devices.

In addition, since the device receiving the multiple service information does not know how many service information should be received, it is necessary to increase the time for receiving the service information in order to receive all the service information provided by a partner device.

In addition, when intending to transmit the advertising packet for a new service while setting the advertisement packet for a specific service and transmitting the advertising packet for a new service to the neighboring device, a controller cannot manage several advertising packet transmitting operations.

Therefore, it is necessary to interrupt an operation of transmitting the existing advertising packet and set and transmit the advertising packet for the new service and such a process is continuously repeated in order to advertise two services.

Further, when additional information that is not received through the advertising packet is additionally requested through the scan response message, since the additional information is decided by the device that transmits the additional information, it is impossible for the device requesting the transmission to request information on the specific service.

Therefore, there is a need for a method for setting multiple advertising packets including different service information and requesting the information on the specific service by the device requesting the additional information.

The technical objects of the present invention are not limited to the aforementioned technical objects, and other technical objects, which are not mentioned above, will be apparently appreciated by a person having ordinary skill in the art from the following description.

Technical Solution

In order to solve the problem, the present invention provides a method for set advertising messages by a device in Bluetooth low energy (LE), including: transmitting, by a host of the device, to a controller of the device a first parameter setting command for setting parameters of two or more advertising messages; receiving, as a response to the parameter setting command from the controller, a first completion command indicating that the setting of the parameters is completed; transmitting, by the host, to the controller a first data setting command for setting first data included in the two or more advertising messages; receiving, in response to the data setting command from the controller, a second completion command indicating that the setting of the data is completed; and transmitting, by the host, to the controller a first instruction command instructing transmission of the two or more advertising messages, in which the first data includes service information indicating one service among multiple services which are enabled to be provided by the device, and each of the two or more advertising messages includes different service information.

Further, in the present invention, the parameter includes at least one of the number of the multiple services, a transmission interval of each of the two or more advertising messages, a scan window size for scanning the two or more advertising messages, transmission power of the two or more advertising messages, or a sequence number indicating a transmission order of the two or more advertising messages.

In addition, in the present invention, the two or more advertising messages include at least one of a transmission interval set by the host, a search window size, and a sequence number of each of the two or more advertising messages which are set by the host.

Moreover, in the present invention, the method further includes transmitting, by the controller, the two or more advertising messages to neighboring devices according to the transmission interval.

Further, in the present invention, the method further includes: transmitting a second parameter setting command for setting parameters of multiple advertising messages related to a specific service and the multiple services when the device additionally supports the specific device; receiving, as a response to the second parameter setting command, from the controller, a third completion command indicating that the setting of the parameters is completed; transmitting, by the host, to the controller a second data setting command for setting second data included in the multiple advertising messages; receiving, in response to the second data setting message, from the controller, a fourth completion command indicating that the setting of data is completed; and transmitting, by the host, to the controller a second instruction command instructing transmission of the multiple advertising messages, and the second data includes service information indicating one service among multiple services and the specific service, and each of the multiple advertising messages includes different service information.

In addition, in the present invention, the two or more advertising messages further includes indication information indicative of an advertisement message including additional information related with the service information.

Moreover, in the present invention, the indication information includes at least one of channel information in which the advertising message is transmitted or an identifier indicating the advertising message.

In addition, the present invention provides a method for transmitting and receiving data to and from a second device by a first device in Bluetooth low energy (LE), including: receiving a first advertising message including first service information from the second device; receiving a second advertising message including second service information from the second device; transmitting a request message for requesting addition information for the second service information to the second device; and receiving a response message including the additional information in response to the request message, in which the first advertising message and the second advertising message are set through one advertising message setting procedure.

Moreover, in the present invention, the request message includes an identifier or a parameter indicting a request of the additional information for the second service information.

Further, the present invention provides a method for receiving an advertising message by a first device in Bluetooth low energy (LE), including: receiving, by a controller of the first device, multiple advertising messages including different service information which is enabled to be supported by a second device from the second device; and transmitting, by the controller, a report message including multiple service information included in the multiple advertising messages to a host of the first device.

In addition, in the present invention, the method further includes transmitting, by the host, the multiple service information to an AP of the first device.

Advantageous Effects

According to the present invention, multiple advertising packets including different service information through Bluetooth LE can be set through one setting procedure.

Further, according to the present invention, the advertising packet for an additional service can be set without interrupting an operation of transmitting the existing advertising packet.

In addition, according to the present invention, it is possible for the device to know whether all of multiple advertising packets including different service information are received, thereby reducing a scanning time for scanning the advertising packet.

Moreover, according to the present invention, a device can request additional information on a specific service to a device that transmits the advertising packet.

Effects which can be obtained in the present invention are not limited to the aforementioned effects and other unmentioned effects will be clearly understood by those skilled in the art from the following description.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

Figure 1:
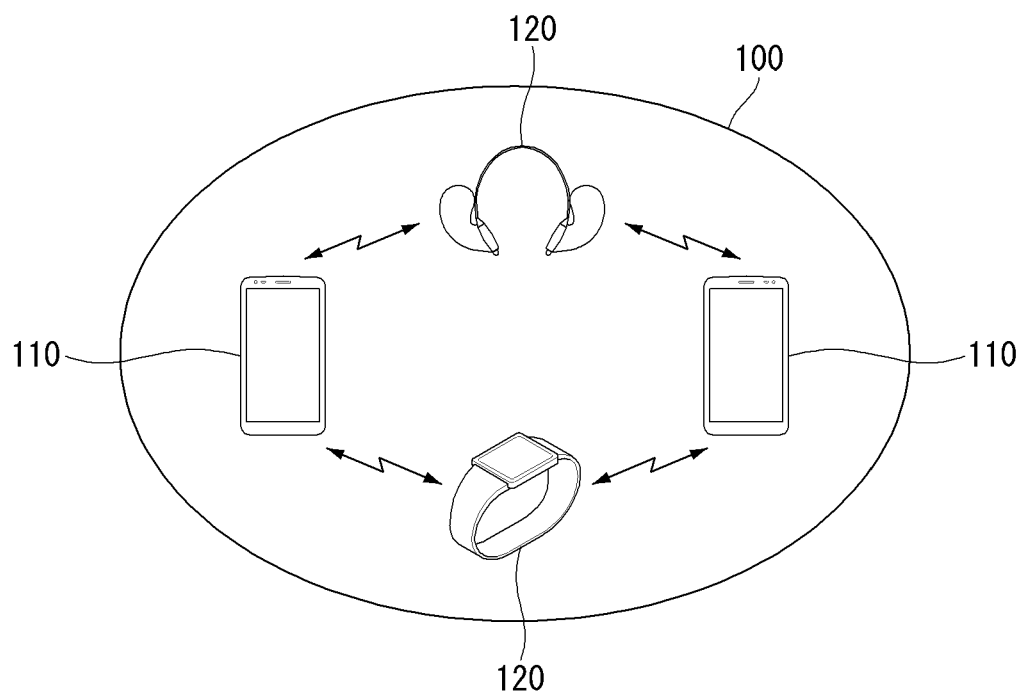
FIG. 1 is a schematic view illustrating an example of a wireless communication system using Bluetooth low energy (BLE) technology proposed in this disclosure.

FIG. 1 is a schematic view illustrating an example of a wireless communication system using Bluetooth low energy (BLE) technology proposed in this disclosure.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device.

That is, in the BLE communication system, any one device may operate as a server device or a client device, or may operate as both a server device and a client device if necessary.

The server device 120 may be expressed as a data service device, a slave device, a slave, a server, a conductor, a host device, a gateway, a sensing device, a monitoring device, a first device, etc. and the client device may be expressed as a master device, a sink device, a collector, a second device, a third device, etc.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Figure 2:
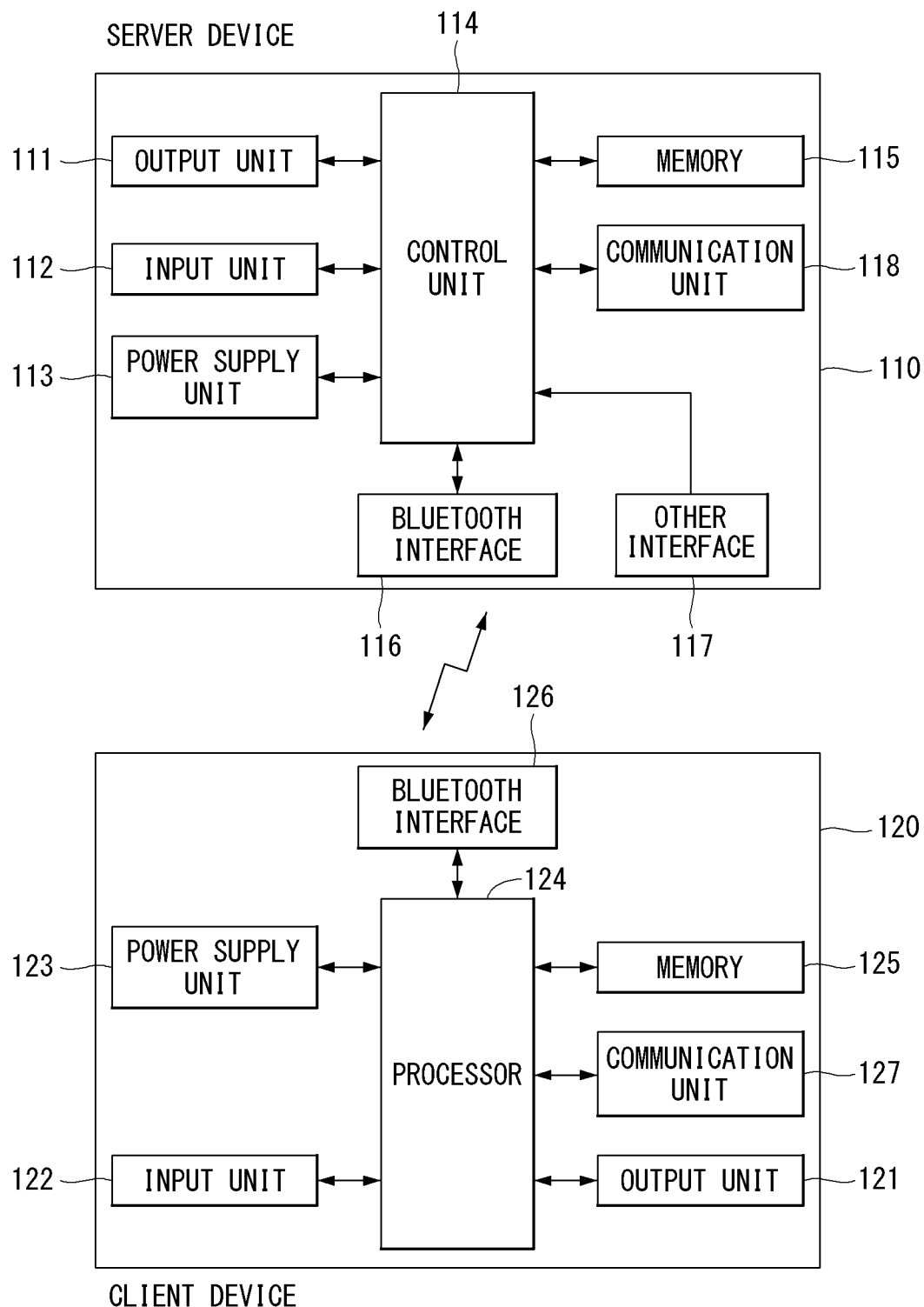
FIG. 2 illustrates an internal block diagram of an example of a device implementing methods proposed in this disclosure.

FIG. 2 illustrates an internal block diagram of an example of a device implementing methods proposed in this disclosure.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, the BLE technology has a small duty cycle and significantly reduce power consumption through a low data transfer rate.

The user input interfaces 112 and 122 refer to modules providing a user input such as a screen button to the controllers to enable the user to control an operation of the devices.

Figure 3:
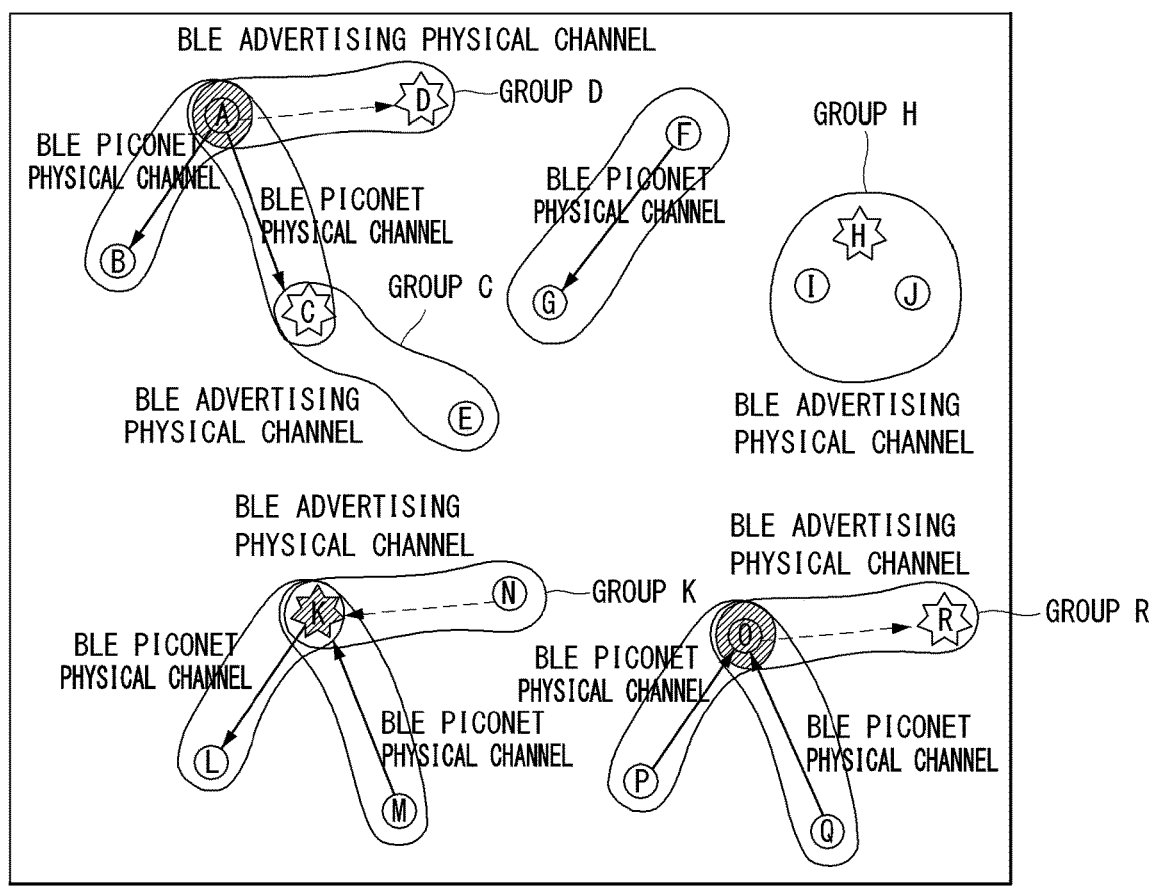
FIG. 3 illustrates an example of BLE topology.

FIG. 3 illustrates an example of BLE topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slave does not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).

2. Device E is a scanner and Device C is an advertiser (group C).

3. Device H is an advertiser, and devices I and J are scanners (group H).

4. Device K is also an advertiser, and device N is an initiator (group K).

5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

Figure 4:
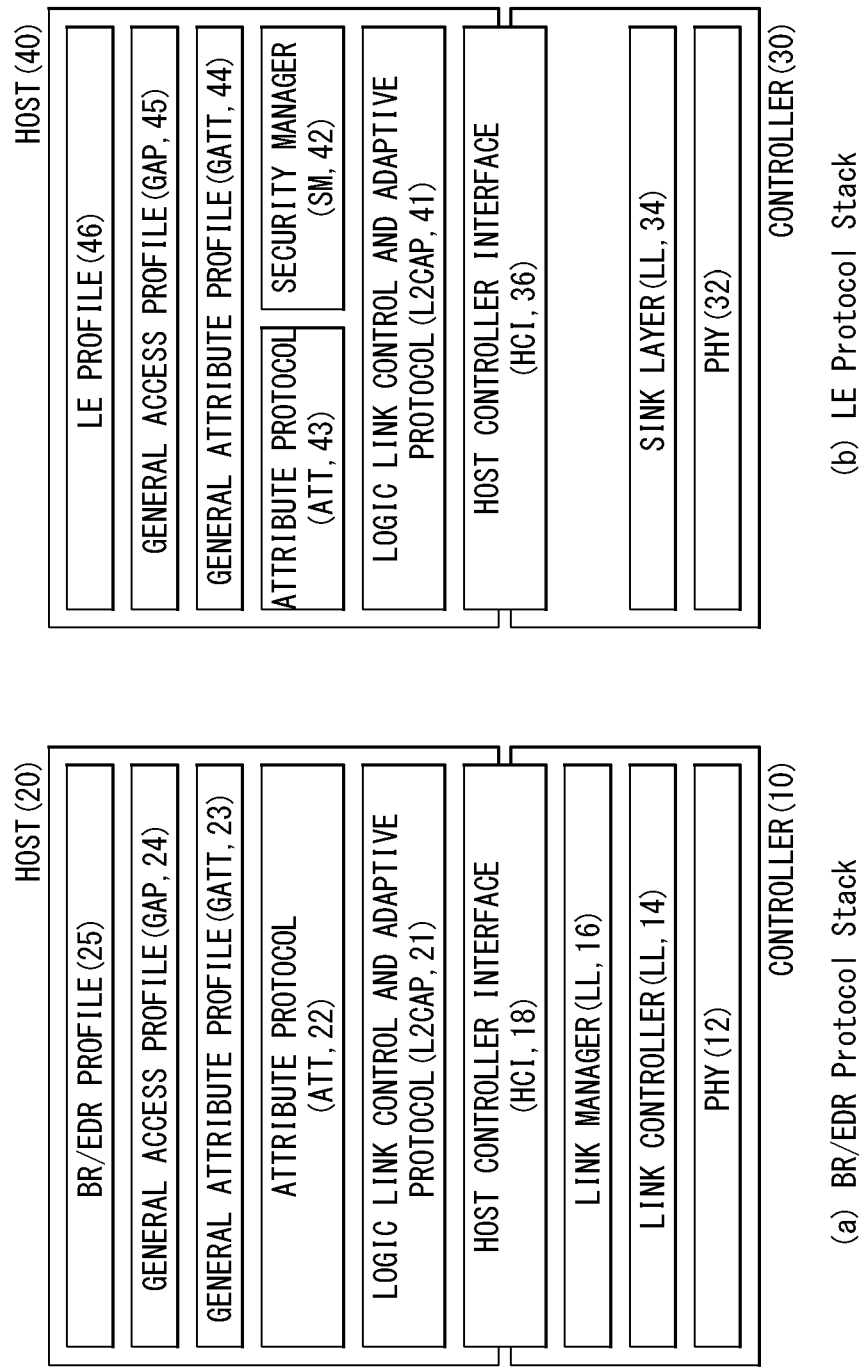
FIG. 4 is a view illustrating an example of Bluetooth communication architecture to which methods proposed in this disclosure may be applied.

FIG. 4 is a view illustrating an example of Bluetooth communication architecture to which methods proposed in this disclosure may be applied.

Referring to FIG. 4, FIG. 4(a) shows an example of a protocol stack of the Bluetooth BR (Basic Rate)/EDR (Enhanced Data Rate), and FIG. 4(b) shows an example of a protocol stack of the Bluetooth Low Energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 10 may include a PHY layer 12, a Link Controller layer 14 and a Link Manager layer 16.

The PHY layer 12 is the layer of transmitting and receiving a radio signals of 2.4 GHz, and may transmit data by hopping 79 RF channels in the case of using the Gaussian Frequency Shift Keying (GFSK) modulation.

The Link Controller layer 14 plays the role of transmitting a Digital Signal, selects the channel sequence of hopping 1400 times per second, and transmits the time slot of 625 μs length for each channel.

The Link Manager layer 16 controls the entire operations (link setup, control and security) of a Bluetooth connection by utilizing the Link Manager Protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the logical link control and the adaptation protocol (L2CAP) 41, the Security Manager (SM) 42, the Attribute Protocol (ATT) 43, the Generic Attribute Profile (GATT) 44, the Generic Access Profile 45 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovery procedure is performed asymmetrically. A Bluetooth device that intends to discover other neighboring devices is called a discovering device and performs listening in order to discover devices that advertise a scannable advertising event. A Bluetooth device discovered and usable by another device is called a discoverable device and broadcasts the advertising event so as to be actively scanned by another device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

Figure 5:
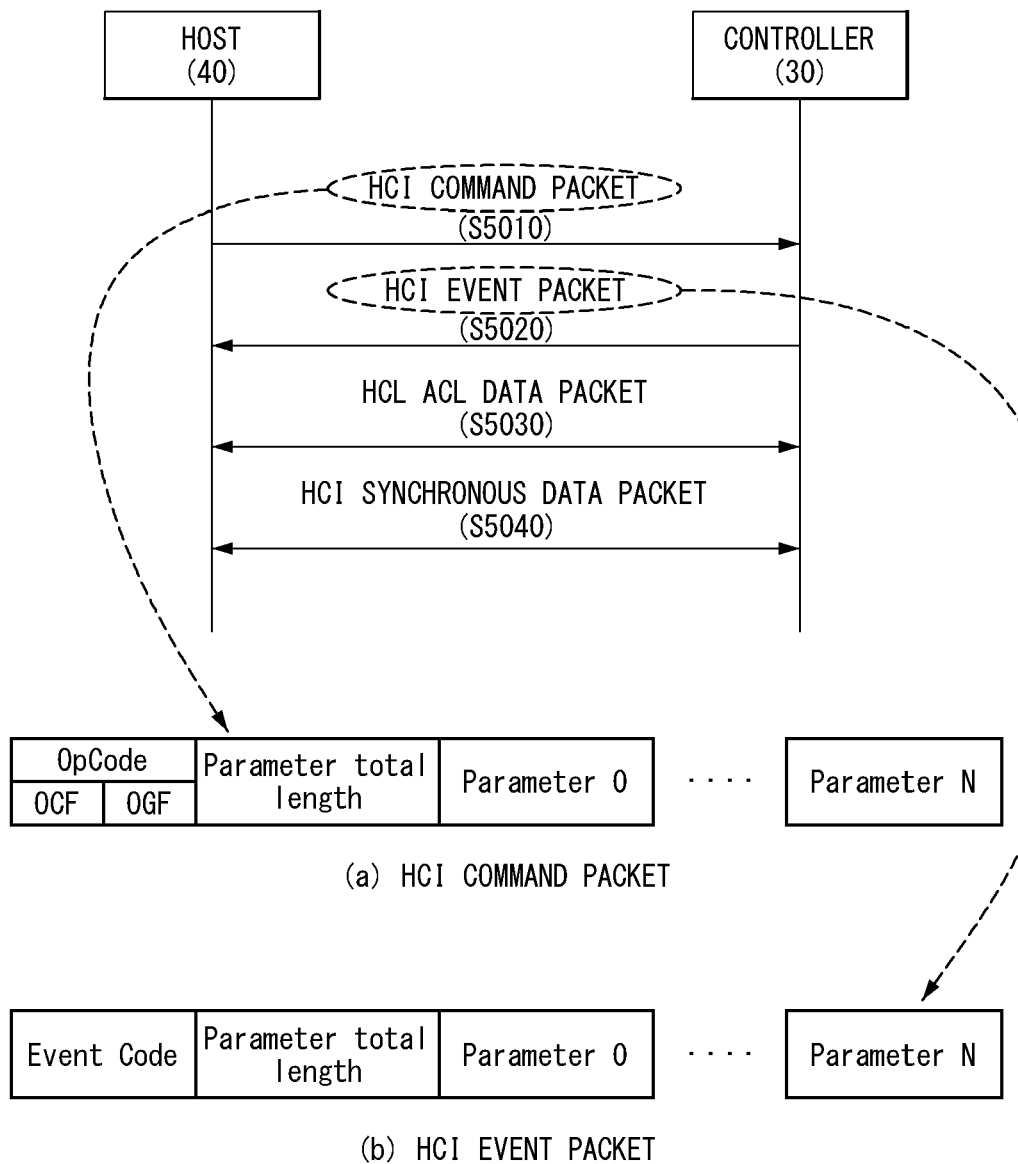
FIG. 5 is a diagram illustrating one example of a message transmitted between a host and a controller of Bluetooth low energy.

FIG. 5 is a diagram illustrating one example of a message transmitted between a host and a controller of Bluetooth low energy.

Referring to FIG. 5, in the Bluetooth LE, the host may instruct the controller to perform a specific operation through the HCI illustrated in FIG. 4, the controller may notify to the host that a specific event occurs, or the control and the host may transmit and receive data.

Specifically, when the host 40 instructs the controller 30 to perform a specific operation, the host 40 transmits an HCI command packet to the controller 40 (S5010).

FIG. 5(a) illustrates one example of a packet format of the HCI command packet and the host 40 may instruct the controller 30 to perform the specific operation through an operation code (OpCode) of the HCI command packet.

For example, the host 40 transmits the HCI command packet to the controller to cause the controller 30 to generate an advertising message for a specific service.

In this case, the generated advertising message may be set by parameters included in the HCI command packet illustrated in FIG. 5(a).

When the specific event occurs, the controller 30 transmits an HCI event packet to the host 40 to notify that the specific event occurs to the host 40 (S5020).

FIG. 5(b) illustrates one example of the packet format of the HCI event packet and the controller 30 may notify to the host 40 what event occurs through an event code of the HCI event packet.

When the host 40 and the controller 30 intend to exchange asynchronous data, the host 40 and the controller 30 may exchange the asynchronous data by transmitting and receiving an HCL ACL data packet (S5030) and when the host 40 and the controller 30 exchange synchronous data, the host 40 and the controller 30 may exchange the synchronous data by transmitting and receiving an HCI synchronous data packet (S5040).

In the present invention, an advertising message including different service information may be set through the HCI command packet.

Figure 6:
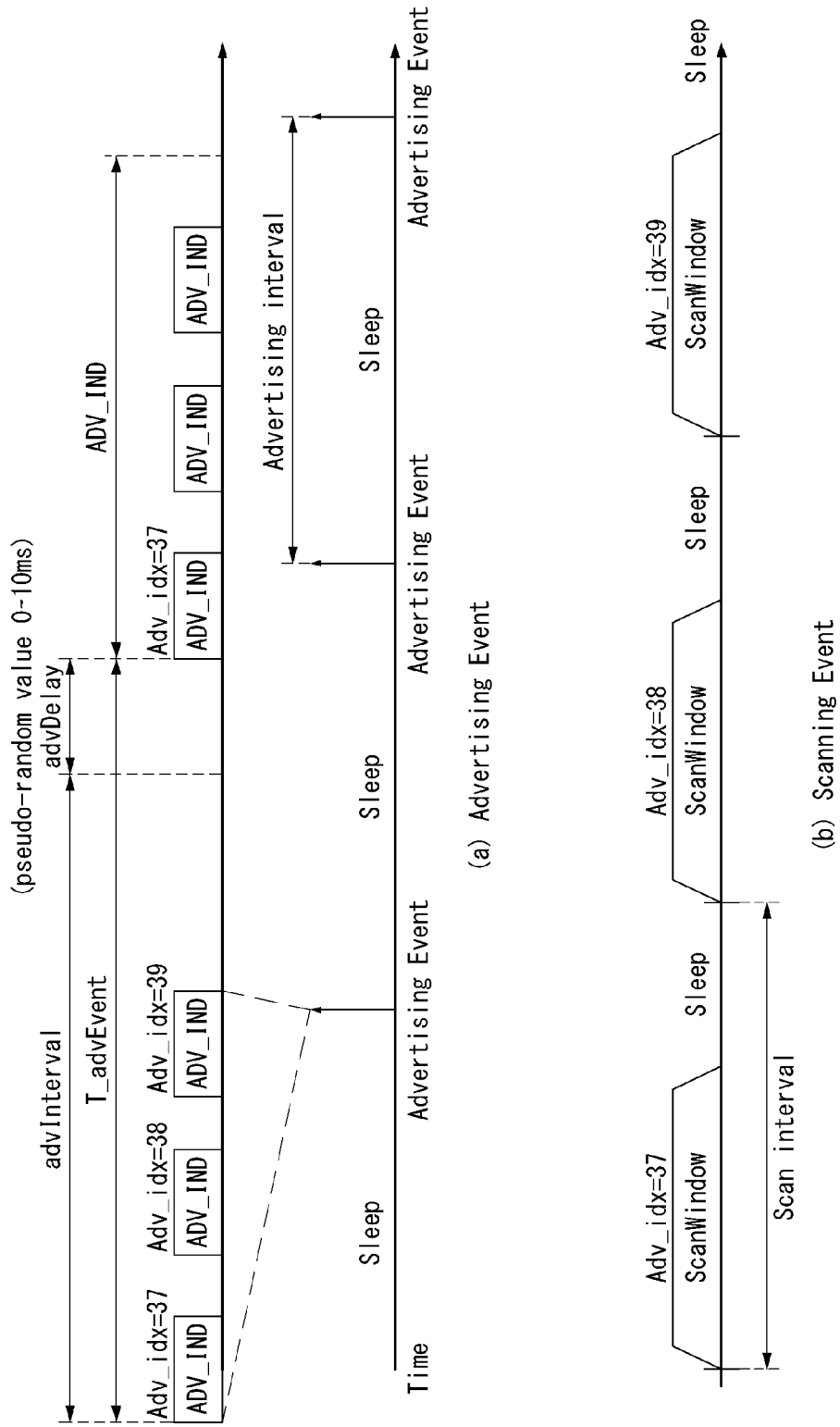
FIG. 6 is a diagram illustrating examples of an advertising event and a scanning event for scanning a device in the Bluetooth low energy.

FIG. 6 is a diagram illustrating examples of an advertising event and a scanning event for scanning a device in the Bluetooth low energy.

Referring to FIG. 6, in the Bluetooth LE, a server device periodically transmits an advertising message for announcing the server device to neighboring devices in an advertising state.

The server device may repeatedly perform such an advertising event at a predetermined interval.

In this case, in the advertising event, the server device transmits the advertising message in each of three advertising channels as described above.

FIG. 6(a) illustrates an operation in the advertising event in which the server device transmits the advertising message. The server device may exist in a sleep mode during a long advertising interval after one advertising event and transmit the advertising message in the advertising event again.

FIG. 6(b) illustrates an operation the client device in a scanning event in which the server device transmits the advertising message.

The client device exists in a scanning state to receive the advertising message transmitted by the server device and receives the advertising message only during a scan window interval of a scan interval set in each advertising channel.

Figure 7:
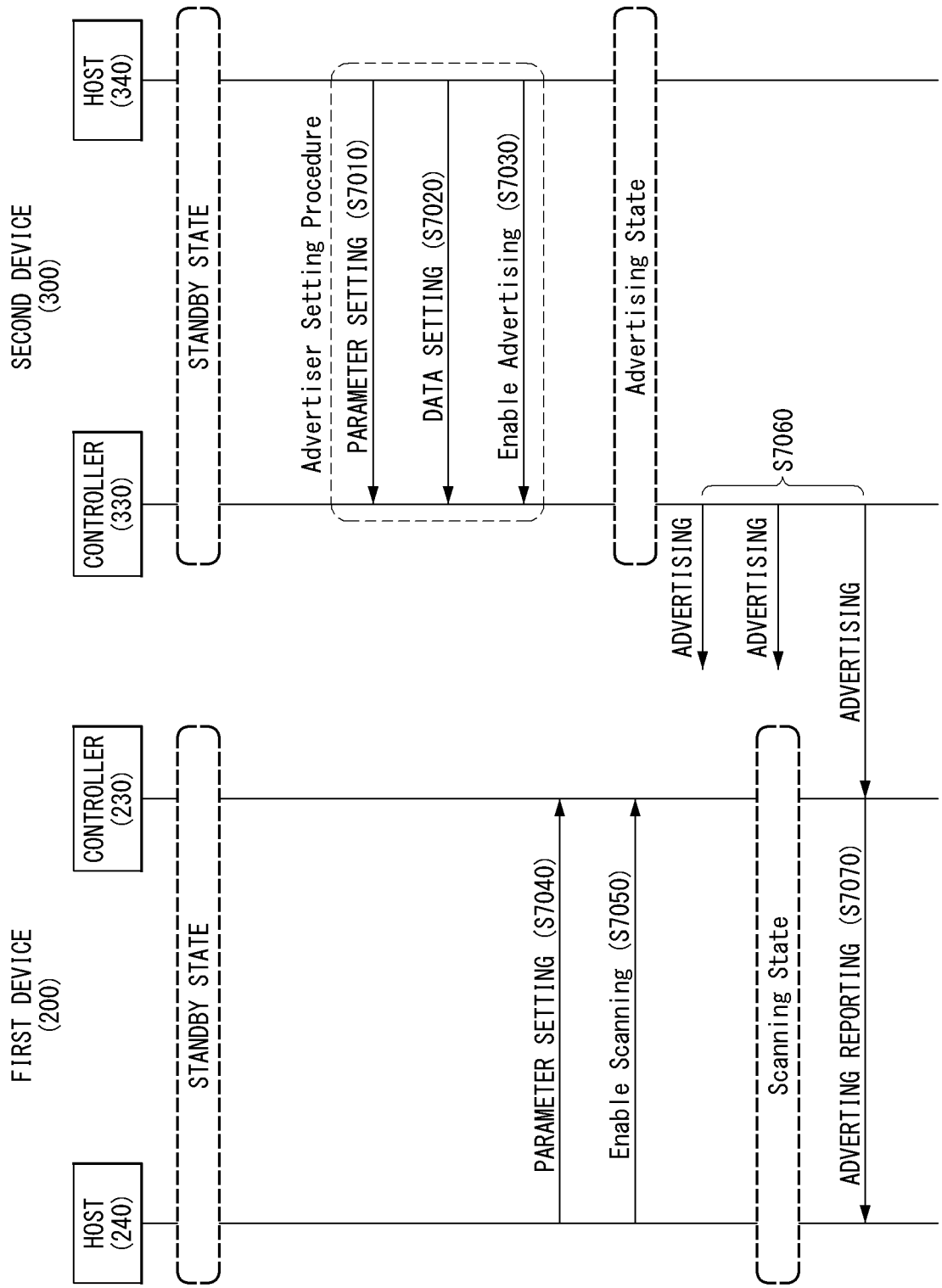
FIG. 7 is a diagram illustrating one example of a method of setting and transmitting a message through a host controller interface (HCI) in the Bluetooth low energy.

FIG. 7 is a diagram illustrating one example of a method of setting and transmitting a message through a host controller interface (HCI) in the Bluetooth low energy.

Referring to FIG. 7, the server device may transmit the advertising message by setting the advertising packet through the HCI command packet illustrated in FIG. 5 and the client device may receive the advertising message by setting the scanning state.

Specifically, a second 300 as the server device and a first device 200 as the client device exist in a standby state.

The second device 300 may set the advertising message including the service information when intends to notify a service (alternatively, profile) which may be provided thereby to the neighboring devices.

Hereinafter, in the present invention, a procedure for setting the advertising message is called an advertiser setting procedure and the advertising message may be referred to as the advertising packet or an advertising PDU.

A host 340 of the second device 300 transmits a parameter setting command to a controller 330 of the second device 300 to set the parameters of the advertising message (S710).

The parameter setting command may have the format illustrated in FIG. 5(a) and may be referred to as HCI_LE_Set_Advertising_Parameters Command.

Table 2 below is a table showing one example of the parameter that may be set through the parameter setting command.

TABLE 2

| Parameter | Description |
| --- | --- |
| Advertising_Interval_Min | Minimum value of Advertising Interval |
| Advertising_Interval_Max | Maximum value of Advertising Interval |
| Advertising_Type | Type of advertising message |
| Own_Address_Type | Address type of device using advertising message |
| Peer_Address_Type | Address type Peer Device |
| Peer_Address | Address of Peer Device |
| Advertising_Channel_Map | Advertising channels for transmitting advertising message |
| Advertising_Filter_Policy | Defining how to use Whitelist in link layer of advertiser |

The controller 330 may set the advertising message with the parameters included in the parameter setting command and transmit a completion command indicating that the parameters are successfully set to the host 340.

Thereafter, the host transmits a data setting command including the service information to the controller in order to make the service information be included in the advertising message (S7020).

The data setting command may have the format illustrated in FIG. 5(a) and may be referred to as HCI_LE_Set_Advertising_Data Command.

The controller 330 that receives the data setting command may make the service information be included in the advertising message and transmit the completion command indicating that the service information is successfully included to the host 340.

Thereafter, the host 340 may transmit an Enable Advertising command for instructing transmission of the advertising message to the controller and receive the completion command from the controller (S7030).

After setting the advertising message, the second device 300 enters the advertising state to transmit the set advertisement message.

The first device 200 as the client device may set the scanning state to receive the advertising messages transmitted from neighboring server devices.

A host 240 of the first device 200 transmits the parameter setting command to a controller 230 of the first device 200 to set the parameters of the scanning state (S7040).

The parameter setting command may have the format illustrated in FIG. 5(a) and may be referred to as HCI_LE_Set_Scan_Parameters Command.

Table 3 below is a table showing one example of the parameter that may be set through the parameter setting command.

TABLE 3

| Parameter | Description |
| --- | --- |
| LE_Scan_Type | Scan type |
| LE_Scan_Interval, | Scan interval |
| LE_Scan_Window | Scan window |
| Own_Address_Type, | Address type of device using scan request message |
| Scanning_Filter_Policy | Defining how to use Whitelist in link layer of scanner |

The controller 230 may set the scan interval, the size of the scan window, and the like illustrated in FIG. 6(b) with the parameters included in the parameter setting command and transmit the completion command indicating that the parameters are successfully set to the host 340.

Thereafter, the host 340 may transmit an Enable Scanning command for instructing the scanning operation to the controller 230 and receive the completion command from the controller (S7050).

After setting the scanning state, the first device 200 enters the scanning state to receive the advertising message.

The controller 330 of the second device 300 may transmit the advertising message based on the parameter set in the first device 200 in the advertising state (S7060).

The controller 230 of the first device 200 may receive the advertising message in the scanning state and may transmit an advertising report event packet to the host of the first device 200 when the advertising message is received (S7070).

In this case, the advertising report event packet may have the packet format illustrated in FIG. 5(b).

By such a method, Bluetooth devices may announce themselves to the neighboring devices or scan the neighboring devices.

Figure 8:
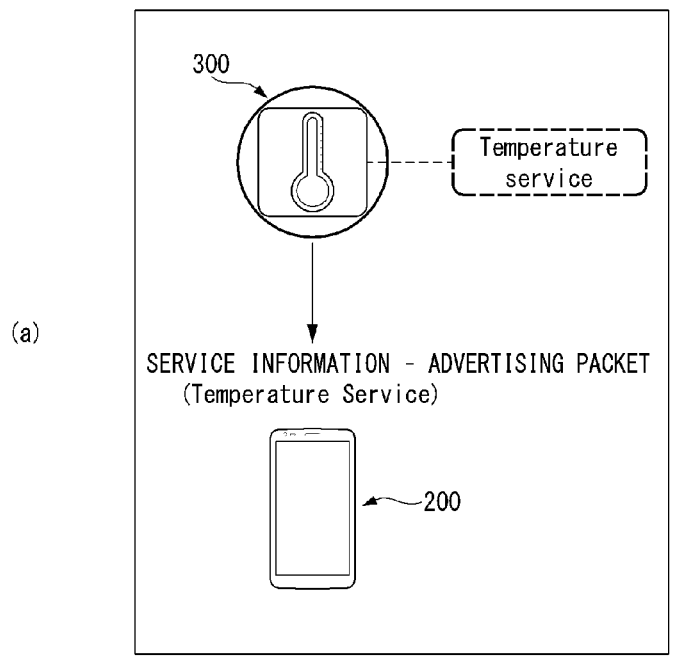
FIG. 8 is a diagram illustrating one example of a structure of a generic attribute profile (GATT) of the Bluetooth low energy.
Figure 8:
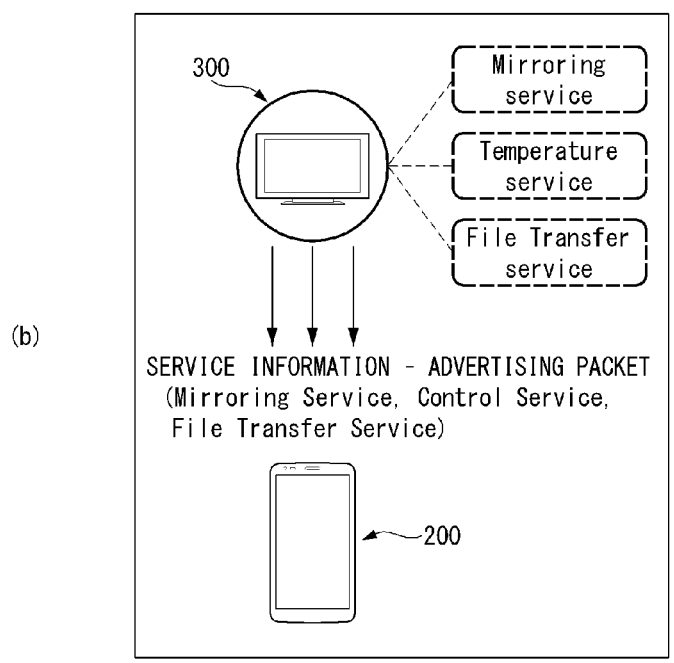
Figure 9:
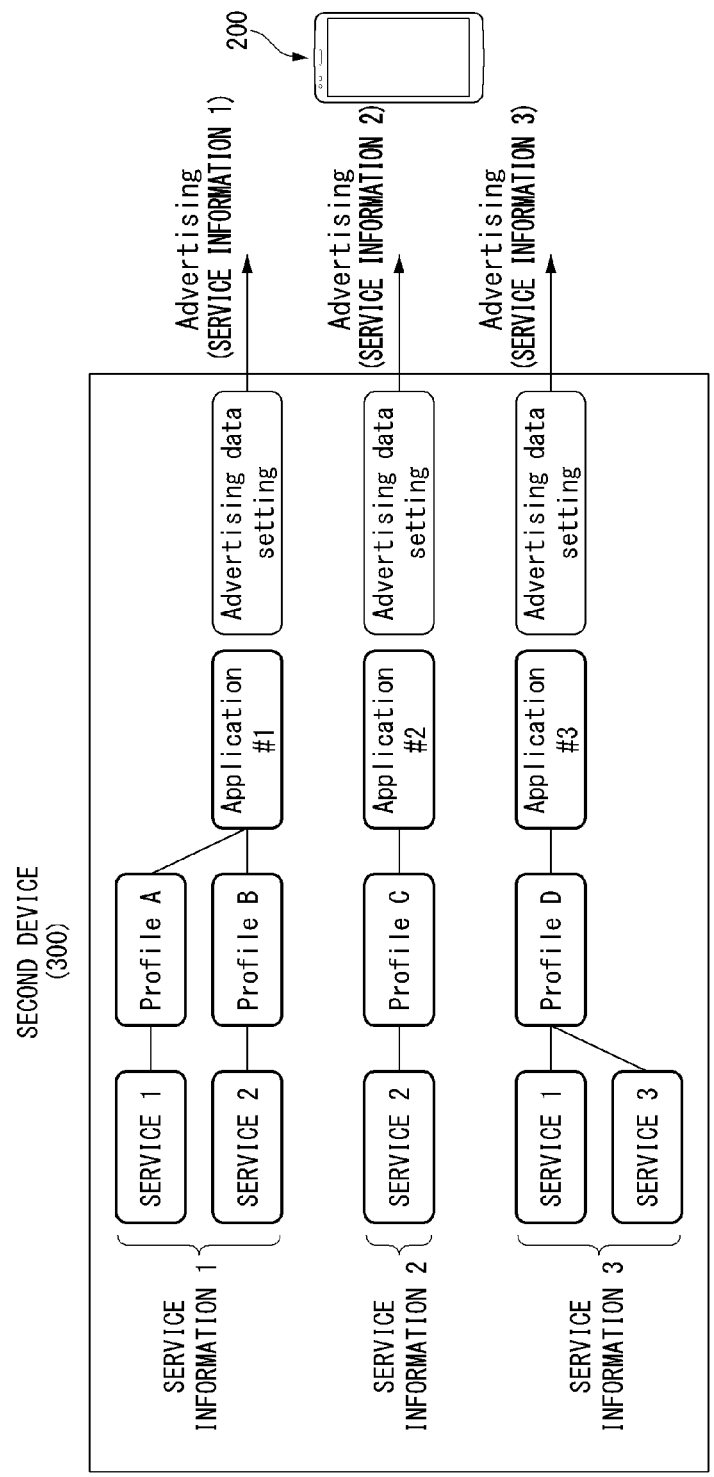
FIG. 9 is a flowchart showing a method of forming a connection using Bluetooth low energy (LE) between devices.
Figure 10:
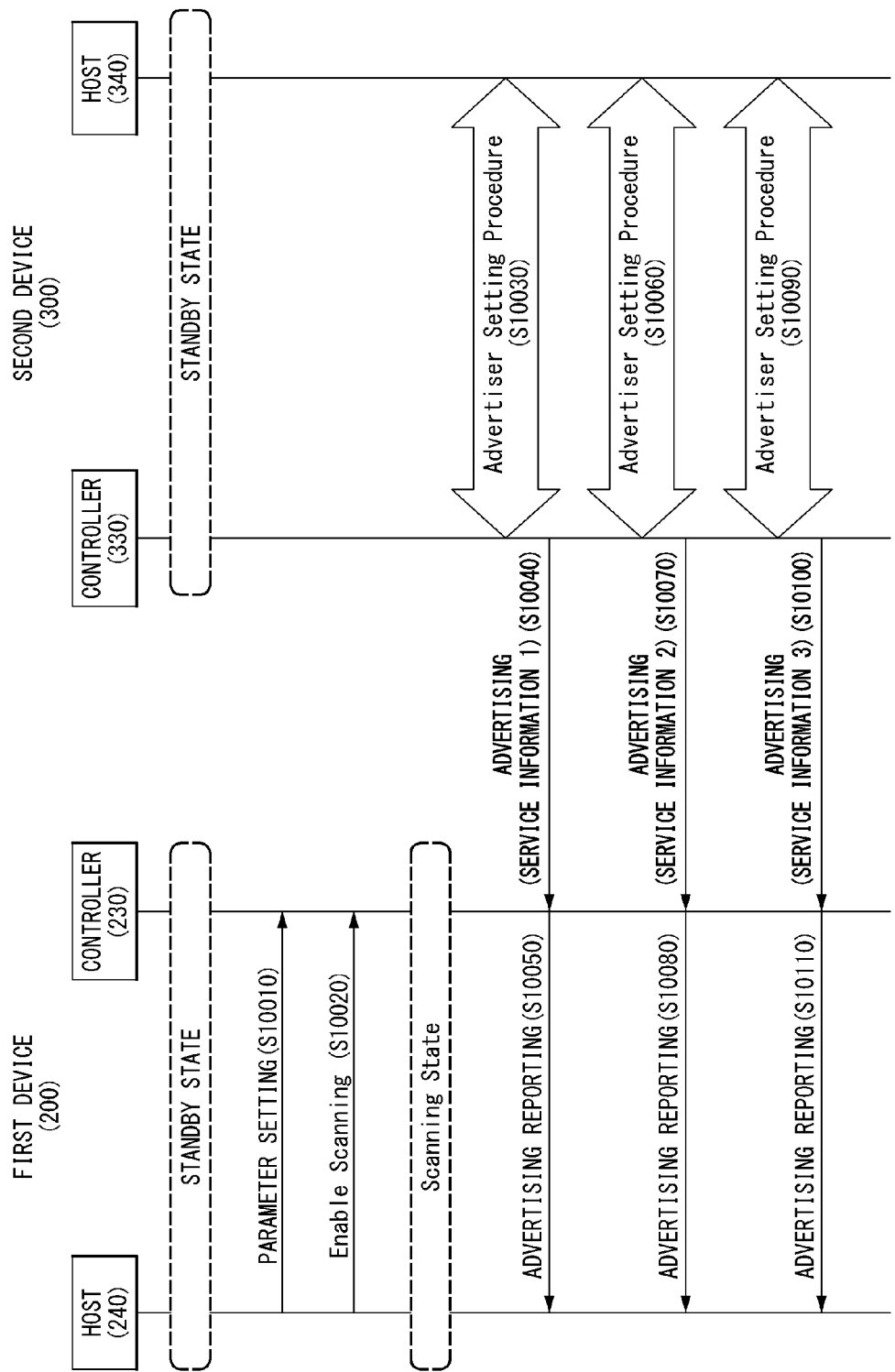
FIGS. 10 to 12 are diagrams illustrating one example of a method for a device supporting multiple services to set and transmit a message including respective service information.

FIGS. 8 to 10 are diagrams illustrating one example of a method for a device supporting multiple services to set and transmit a message including respective service information.

Referring to FIG. 8(a), when the second device 300 provides one service (for example, a temperature service), the second device 300 transmits the advertising message including information related with the service to the first device 200 through the scheme illustrated in FIG. 7.

However, as illustrated in FIG. 8(b), when the second device 300 provides multiple services (for example, mirroring, control, file transfer service, etc.), the second device 300 needs to transmit the advertising message including multiple service information.

In this case, due to a size restriction of the advertising message, the multiple service information needs to be divided into appropriate sizes and transmitted while being included in multiple advertising messages.

However, since the Bluetooth LE does not have a function to set the multiple service information in the multiple advertising messages, the advertising message needs to be set and transmitted by performing a separate "advertiser setting procedure" for each service.

For example, the second device 300 needs to set information related to the mirroring service in the advertising message through the "advertiser setting procedure" and set the information related to the control service in the advertising message through the "advertiser setting procedure" again and transmit the set information to the first device 200, and set information related to the File Transfer service through the "advertiser setting procedure" and transmit the set information to the first device 200 again.

That is, as illustrated in FIG. 9, in the Bluetooth LE, the second device 300 includes application 1 including service 1 and service 2, application 2 including the service 2, and application 3 including the service 1 and the service 3, the information to be transmitted by the applications 1, 2, and 3 may be different from each other as service information 1, 2, and 3.

In this case, since the second device 2 300 may not set the multiple advertising messages through one "advertiser setting procedure", the second device 300 needs to set the advertising messages through individually "advertiser setting procedures", respectively and transmit the set advertising messages to the first device 200.

Specifically, as illustrated in FIG. 10, 10, the first device 200 sets the scanning state and enters the scanning state through steps S10010 and S10020 similarly to the method described in steps S7040 and S7050 of FIG. 7.

The second device 300 sets the advertising message including the service information 1 of FIG. 9 through the "advertiser setting procedure" illustrated in FIG. 7 (S10030) and transmits the set advertising message to the first device 200 (S10040).

The controller 230 of the first device 200 that receives the advertising message transmits the advertising report event packet illustrated in FIG. 7 to the host 240 of the first device 200 to notify that the advertising message including the information A is received (S10050).

Thereafter, the second device 300 sets the advertising message including the service information 2 by performing the "advertiser setting procedure" again (S10060) and transmits the set advertising message to the first device 200 (S10070).

The controller 230 of the first device 200 that receives the advertising message transmits the advertising report event packet illustrated in FIG. 7 to the host 240 of the first device 200 to notify that the advertising message including the information B is received (S10080).

The second device 300 sets the advertising message including the service information 3 by performing the same process again (S10090) and transmits the set advertising message to the first device 200 (S10100).

The controller 230 of the first device 200 that receives advertising message transmits the advertising report event packet to the host 240 of the first device 200 once again to notify that the advertising message including the information C is received (S10110).

By such a method, the second device 300 providing multiple services may transmit information on each service to the first device 200.

However, the method of repeatedly setting and transmitting the advertising message for each service is inefficient in terms of a device operation and there is a problem that collision between the service information may occur.

Accordingly, in order to solve such a problem, the present invention proposes a method of setting multiple advertising messages including different service information through one setting procedure.

Figure 11:
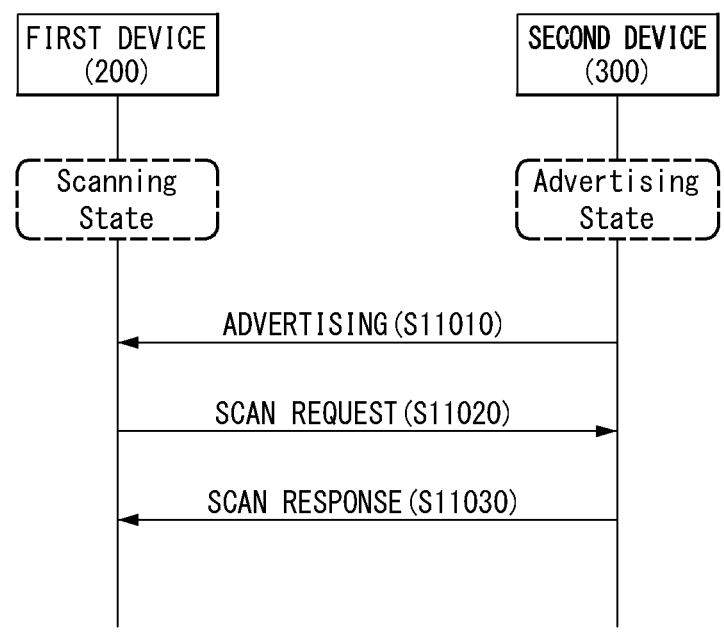

FIG. 11 is a diagram illustrating one example of a method for requesting additional information on the received message.

Referring to FIG. 11, the second device 300 sets the advertising message including information related to a specific service through the method described in FIG. 7 and enters the advertising state to transmit the set advertising message to the first device 200 (S11010).

The first device 200 sets the scan interval, the scan window, and the like in the scanning state through the method described in FIG. 7 and enters the scanning state to receive the advertising message from the second device 300.

When the first device 200 that receives the advertising message requests additional information for the advertising message, the first device 200 transmits a scan request message to the second device 300 (S11020) and receives a scan response message including the additional information as a response thereto (S11030).

However, when the first device 200 requests the additional information, since the scan request message includes only the address of the second device 300, the first device 200 may only request the additional information through the scan request message and may not specifically determine the additional information.

That is, the additional information included in the scan response message may be determined by the second device 300 and the first device 1 200 may only receive the transmitted information.

Therefore, when the second device 300 has the information A, B, and C and the additional information regarding the information A, B, and C as illustrated in FIG. 9, there is a problem that the first device 200 may not select and request only additional information desired thereby.

In order to solve such a problem, the present invention proposes a method in which the device may request the additional information desired thereby.

Figure 12:
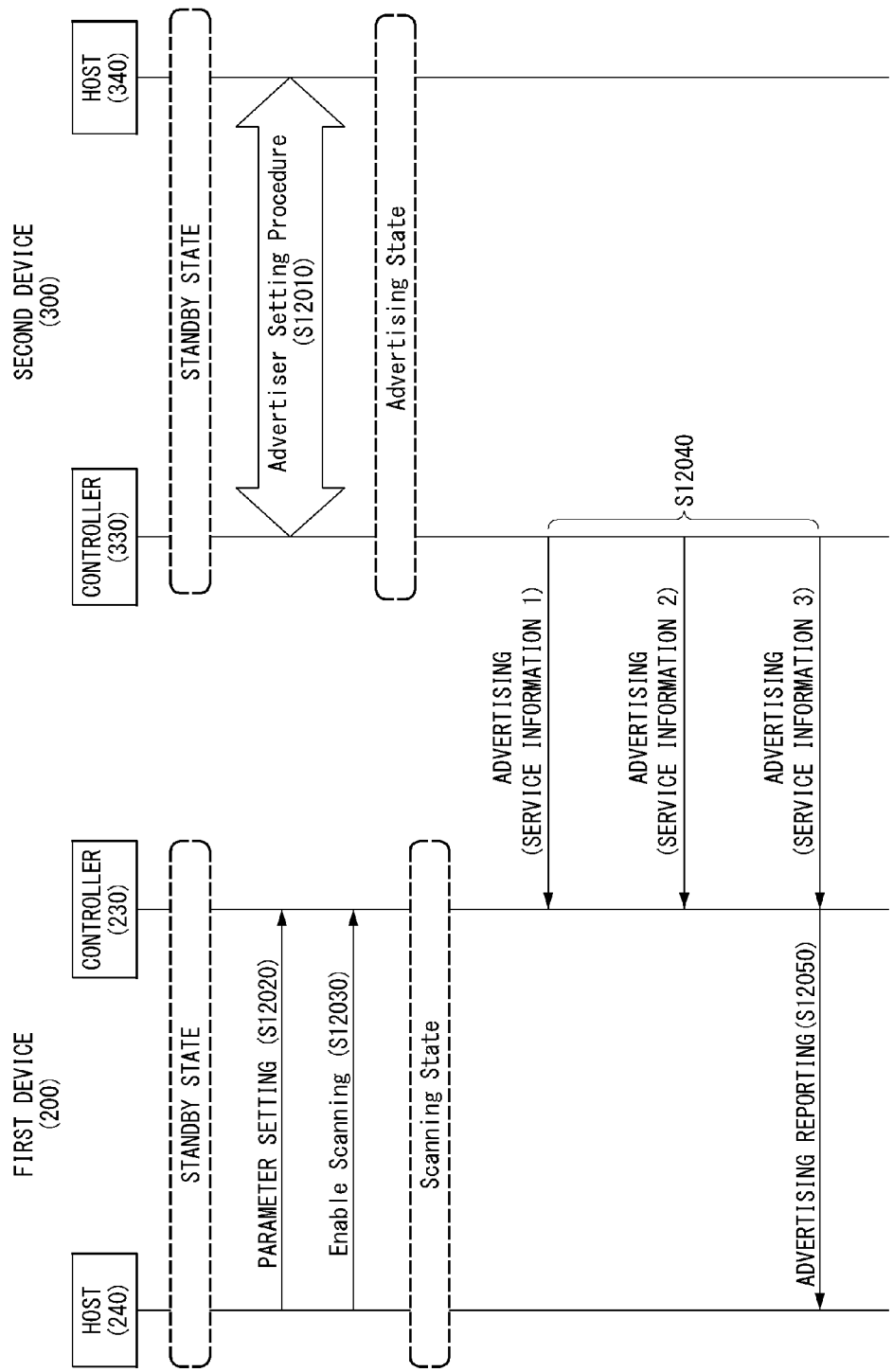

FIG. 12 is a diagram illustrating one example of a method for transmitting and transmitting a message including different service information to which the present invention is applied and receiving the message.

Referring to FIG. 12, the second device 300 may set multiple advertising messages including different service information through the advertising message setting procedure and when all service information is transmitted through the advertising event packet, the controller 230 of the first device 300 may notify that all of the service information is transmitted to the host 240.

Specifically, it is assumed that the first device 200 and the second device 300 are in the standby state and the second device 300 provides multiple services.

In order to notify to the neighboring devices that the second device 300 provides the multiple services, the second device 300 may set the multiple advertising messages including different service information through one advertising message setting procedure (S12010).

Hereinafter, the advertising message setting procedure will be referred to as "multi-advertiser setting procedure".

The second device 300, which sets the multiple advertising messages including different service information through the multi-advertiser setting procedure, enters the advertising state.

The host 240 of the first device 200 transmits the parameter setting command to the controller 230 of the first device 200 in order to set parameter values of the scanning state for the multiple advertising messages including the different service information (S12020).

The parameter setting command may be referred to as an HCI_LE_Set_Scan_Parameter command.

When the parameter setting is completed, the controller 230 may transmit the completion command to the host 240.

Thereafter, the host 240 may transmit an Enable Scanning command for instructing the scanning operation to the controller 230 and receive the response thereto (S12030).

The first device 200 in which the parameters for receiving the multiple advertising messages may enter the scanning state and receive the different service information (service information 1, service information 2, and service information 3) transmitted from the second device 2 300 (S12040).

The controller 230 may notify that advertising message including the specific service information is received by transmitting the advertising report event packet to the host 240 whenever the respective advertising messages are transmitted, but notify that the multiple advertising messages are received by transmitting the advertising report event packet to the host 240 after all of the advertising messages including the different service information are received.

By such a method, when the second device 300 may provide the multiple services, it is possible to set the multiple advertising messages including the different service information through one procedure and it is possible to notify to the host that multiple different service information is received through one message.

Hereinafter, each procedure will be described in detail.

Figure 13:
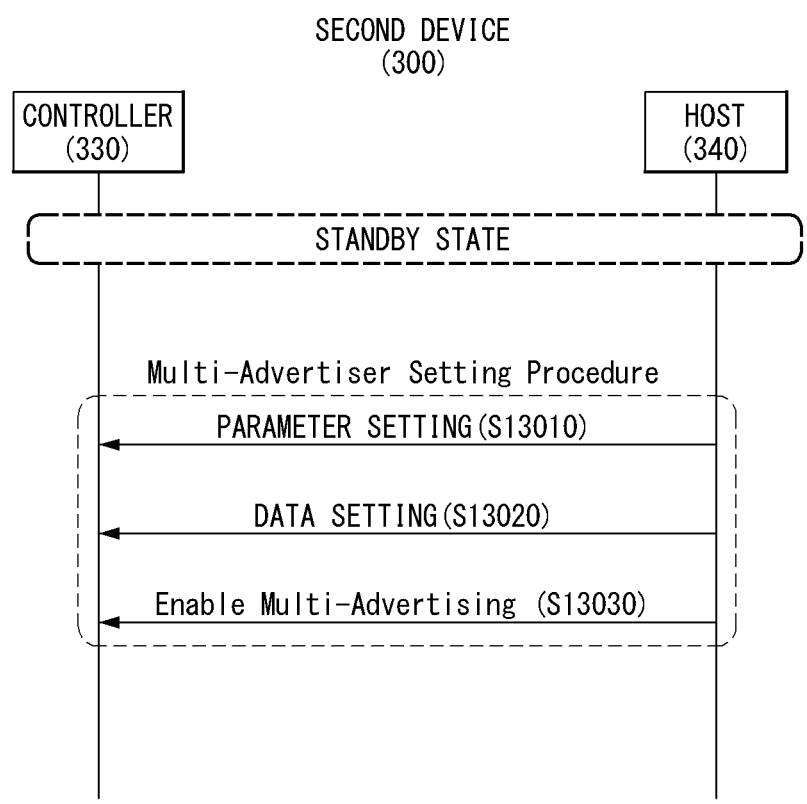
FIG. 13 is a diagram illustrating one example of a method for requesting additional information on the received message.
Figure 14:
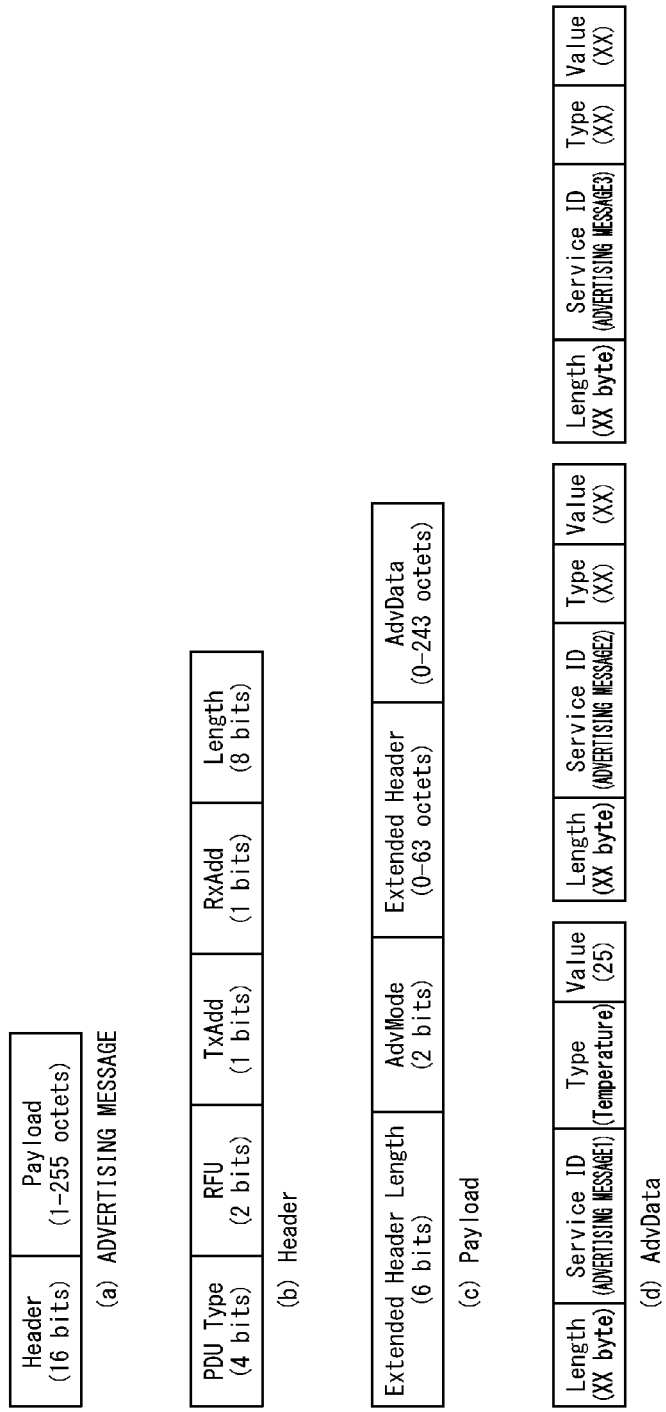
FIG. 14 is a diagram illustrating one example of a method for setting and transmitting a message including different service information to which the present invention is applied and receiving the message.

FIGS. 13 and 14 are diagrams illustrating examples of a method for setting a message including different service information to which the present invention is applied and a message format.

Referring to FIGS. 13 and 14, the multiple advertising messages including the different service information may be set through the "Multi-Advertiser Setting Procedure" described in FIG. 12.

Specifically, it is assumed that the second device 300 may be in the standby state and may provide the multiple services.

The host 340 of the second device 300 may transmit the parameter setting command (first parameter setting command) to the controller in order to set the parameters of the multiple advertising messages including the different service information (for example, service information 1, service information 2, and service information 3) (S13010).

The service information is information including the information related to the specific service.

Table 3 below is a table showing one example of the parameter that may be set through the parameter setting message.

TABLE 4

| Parameter | Description |
| --- | --- |
| Number of Advertising Entity | Parameter indicating the number of advertising message types |
| Multi-Advertising Interval | Parameter for determining a transmission interval of multiple advertising messages |
| Recommended Scan Window | Value for the scan window for efficiently receiving multiple advertising messages |
| Tx Power | Transmission power of each advertising message |
| Multiple-ADV Sequence Number | Sequence number included in each advertising message to be suitable for the type of the advertising message transmitted by the device that transmits multiple advertising messages |

The controller 330 may set the parameter of each advertising message based on the parameter value included in the parameter setting command and transmit the completion command (first completion command) to the host 340.

After the parameter values of the advertising messages are set, the host 340 transmits a data setting command to the controller 330 in order to set data to be included in each advertisement message (S13020).

The data setting message includes the service information (service information 1, service information 2, and service information 3) to be included in the respective advertisement messages, respectively.

The data set through the data setting command may include one of the service information 1, the service information 2, and the service information 3.

After receiving the data setting command, the controller 330 may sets different advertising information to be included in the respective advertising messages and transmit the complete command to the host 340.

When the setting of the parameters and the data of the advertisement message is completed, the host 340 transmits an Enable Multi-Advertising command (first instruction command) to instruct the controller 330 to transmit the multiple advertising messages (S13030).

The controller 330 may receive the Enable Multi-Advertising command and transmit the completion command to the host in response thereto.

Thereafter, the second device 300 continuously sequentially transmits the multiple advertising messages including the different service information set through the "multi-advertiser setting procedure" to the neighboring devices.

In this case, the multiple advertising messages may include parameters such as "Number of Advertising Entity", "Multi-Advertising Interval", "Recommended Scan Window", "Tx Power", and "Multiple-ADV Sequence Number".

In addition, when the advertising message including the additional information related to the different service information included in the multiple advertising messages is transmitted through a data channel or an advertising channel, the multiple advertising messages may include indication information indicating the advertising message including the additional information.

The instruction information may include channel information on which the advertising message including the additional information is transmitted and an identifier indicating the advertising message.

Further, the multiple advertising messages may include identification information (e.g., ID) for distinguishing the multiple advertisement messages, respectively.

By such a method, the device may set the multiple advertising messages including the different service information through one procedure.

As another embodiment of the present invention, one advertising message including the multiple service information may be set through the "Multi-Advertiser Setting Procedure".

When the host 340 sets the value of the "Number of Advertising Entity" value in step S13010 to 1 and the set value and transmits the multiple service information through the data setting command in step S13020 and instructs the multiple service information, the controller 330 may make the multiple service information be included in one advertising message.

FIG. 14 illustrates on e example of the packet format of the advertising message including the multiple service information.

The advertising message including the multiple service information may be constituted by a 16-bit header and a payload having a size of 1 to 255 octets as illustrated in FIG. 14(a).

The header may be configured as illustrated in FIG. 14(b), and the payload may be configured as illustrated in FIG. 14(c).

The multiple service information may be included in an AdvData field of the payload and may be included while being classified into service IDs indicating respective services as illustrated in FIG. 14(d).

Accordingly, the second device 300 may set one advertising message including the multiple service information and transmit service information, which is information related to multiple services which the second device 300 may provide to other devices.

Figure 15:
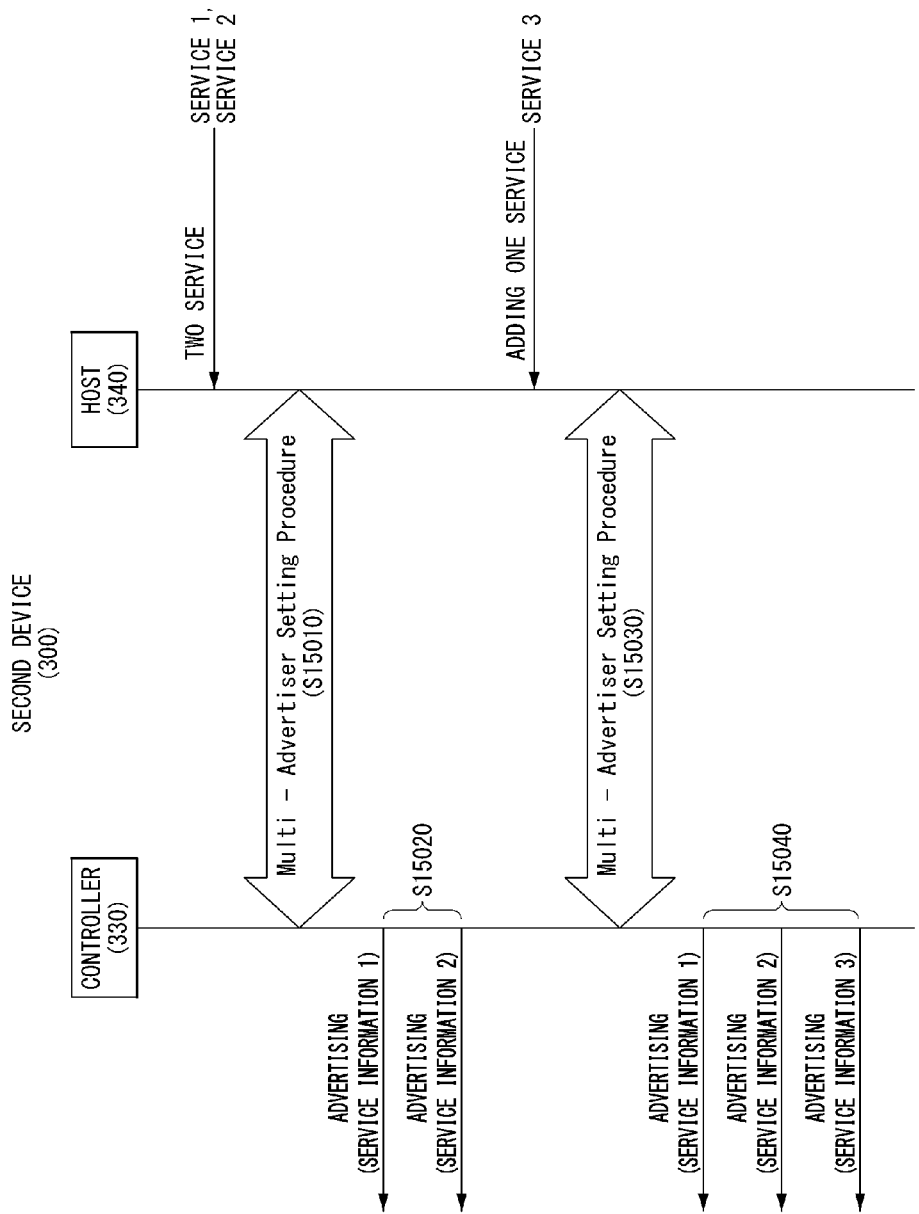
FIGS. 15 and 16 are diagrams illustrating examples of a method for setting a message including different service information to which the present invention is applied and a message format.

FIG. 15 is a diagram illustrating one example of a method for setting a message including different service information when a service to which the present invention is applied is additionally supported.

Referring to FIG. 15, when the multiple advertising messages including the different service information are set through the "Multi-Advertiser Setting Procedure" and thereafter, an advertising message including new service information is intended to be additionally set, the "Multi-Advertiser Setting Procedure" may be performed again.

Specifically, the second device 300 may provide two services (service 1 and service 2).

When the second device 300 intends to set the advertising message including the service information 1 related to the service 1 and the advertising message including the service information 1 related to the service 1, the second device 300 may set each of the advertising message including the service information 1 and the advertising message including the service information 2 by performing the "Multi-Advertiser Setting Procedure" (S15010).

Thereafter, the second device may continuously sequentially transmit the set advertising messages to the neighboring devices through the advertising channel or the data channel (S15020).

Thereafter, when the second device may additionally provide the service 3, the second device 300 may set the advertising message including the service information 3 by performing "Multi-Advertiser Setting Procedure" again (S15030).

In this case, the multiple advertising messages including the service information 1, the service information 2, and the service information 3, respectively may be newly set or only the advertising message including the service information 3 may be newly set through the "Multi-Advertiser Setting Procedure".

That is, the host 340 of the second device 300 may reset the parameter by transmitting the parameter setting command (second parameter setting command) described above to the controller 330 and receive the completion command (third completion command) in response thereto.

Thereafter, the host 340 may reset the data included in the advertising message by transmitting the parameter setting command (second parameter setting command) described above to the controller 330 and receive the completion command (fourth completion command) in response thereto.

Then, the host 340 may transmit an Enable Multi-Advertising command (second instruction command) for instructing the controller 330 to transmit the multiple advertising messages including different reset service information.

Thereafter, the second device may continuously sequentially transmit the reset advertising messages to the neighboring devices through the advertising channel or the data channel (S15040).

Even though a new service is added through such a method, the advertising message including the service information related thereto may be newly set.

Figure 16:
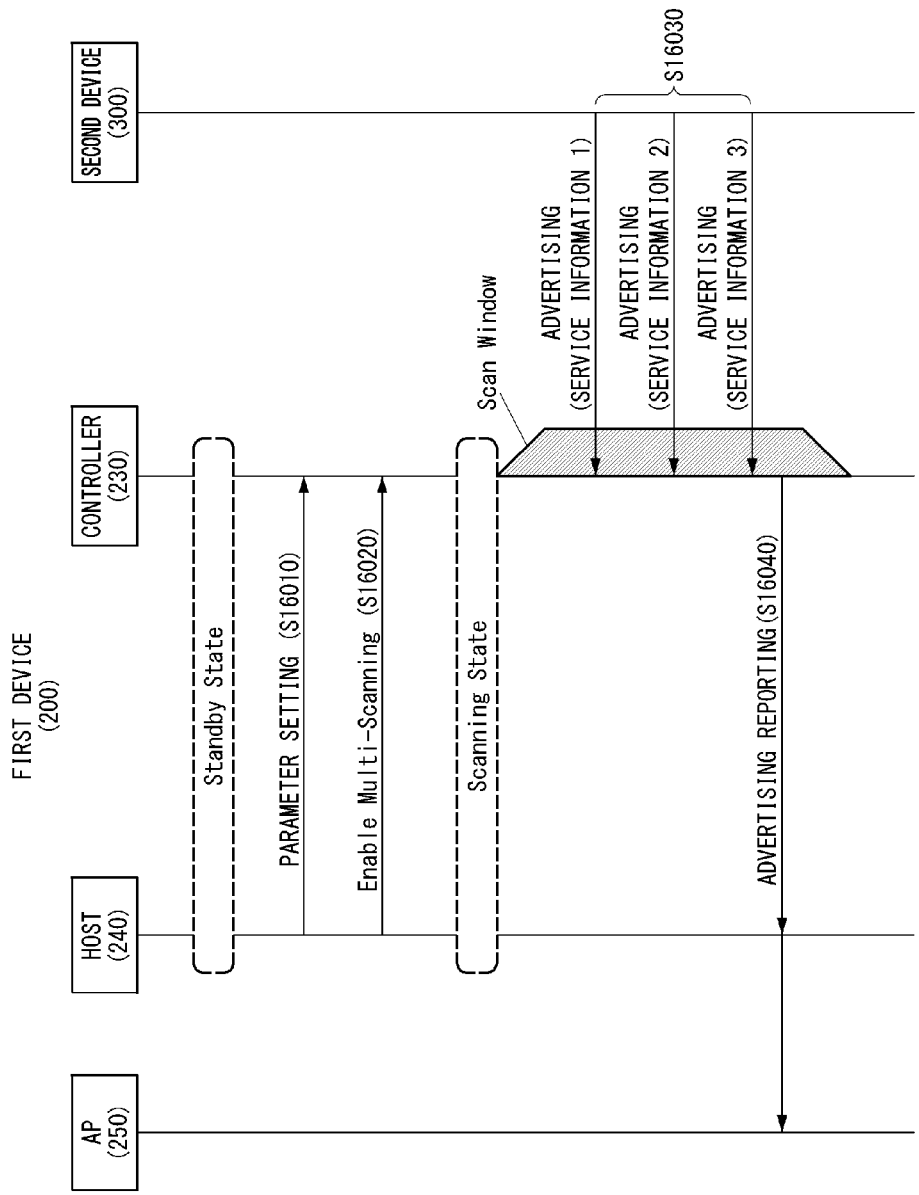

FIG. 16 is a diagram illustrating one example of a method for receiving multiple messages including different service information to which the present invention is applied.

Referring to FIG. 16, when the multiple advertising messages including the different service information are transmitted from the second device 300, the first device sets parameter values for receiving the advertising message to efficiently the multiple advertising messages.

Specifically, the host 240 of the first device 200 that exits in the standby state may transmit the parameter setting command to the controller 230 of the first device 200 in order to set the parameters in the scanning state for receiving the advertising messages transmitted from the neighboring devices (S16010).

Table 4 below is a table showing one example of the parameter that may be set through the parameter setting message.

TABLE 5

| Parameter | Description |
| --- | --- |
| Multi-Scan Window Size | Value of scan window size for efficiently receiving multiple advertising messages based on a "Recommended Scan Window" value included in the advertising message |
| Rx Threshold | Threshold of reception power of the device receiving the advertising message |
| Multi-Scan Interval Size | Scan interval for efficiently receiving multiple advertising messages |
| Multi-Advertising Report Time | Time of transferring a scan result to an application processor (AP). Has a value of '0' when the scan result is received as the advertising message and immediately transferred. Has a specific value when result values received for a predetermined time are stored and transmitted at once and the scan result is transferred to the AP after the specific value. |

The controller 230 may set various parameters related to the scanning state based on the parameter value included in the parameter setting command and transmit the completion command to the host 240.

After the parameters are set, the host 240 transmits the host 240 the Enable Multi-Advertising command to the controller 230 in order to instruct the controller 230 to receive the advertising messages transmitted from the neighboring devices by entering the scanning state (S16020).

The controller 330 may receive the Enable Multi-Advertising command and transmit the completion command to the host in response thereto.

Thereafter, the second device 300 enters the scanning state to receive the multiple advertising messages including the different service information transmitted by the second device 300 (S16030).

The multiple advertising messages may be advertising messages set through the method described in FIG. 13 or 14.

In this case, the controller 230 may adjust the size of the scan window based on the parameters such as "Number of Advertising Entity", "Multi-Advertising Interval", "Recommended Scan Window", and "Multiple-ADV Sequence Number".

The controller 230 may efficiently receive the multiple advertising messages through the adjusted scan window. For example, a scan window having an appropriate size for receiving the multiple advertising messages may be known through "Number of Advertising Entity", or "Recommended Scan Window" indicating the number of the types of the multiple advertising messages.

In this case, the adjusted size of the scan window may be referred to as "Multi-Scan Window Size" and the adjusted size of the scan window may be referred to as "Multi-Scan Interval Size".

There may be multiple methods for setting the "Multi-Scan Window Size" and the "Multi-Scan Interval Size".

When the advertising message is received, the controller 230 may notify to the host 240 that the advertising message is received.

In this case, whenever the controller 230 receives the respective multiple advertising messages, the controller 230 does not notify to the host 240 that the respective multiple advertising messages are received and after some or all of the multiple advertising messages are received, the controller 230 may notify to the host that the corresponding advertising messages are received through the advertising report event packet.

When the host 240 receives the advertising report event packet from the controller 230, the host 240 may notify to the application processor (AP) that the advertising report event packet is received.

Accordingly, the controller 230 may efficiently receive the multiple advertising messages including the different service information by adjusting the size of the scan window.

In addition, when all the service information is received or only some of the service information is received, the operation time of the host and the AP is reduced by notifying that the corresponding service information is received to the host and the AP, thereby reducing power consumption.

Figure 17:
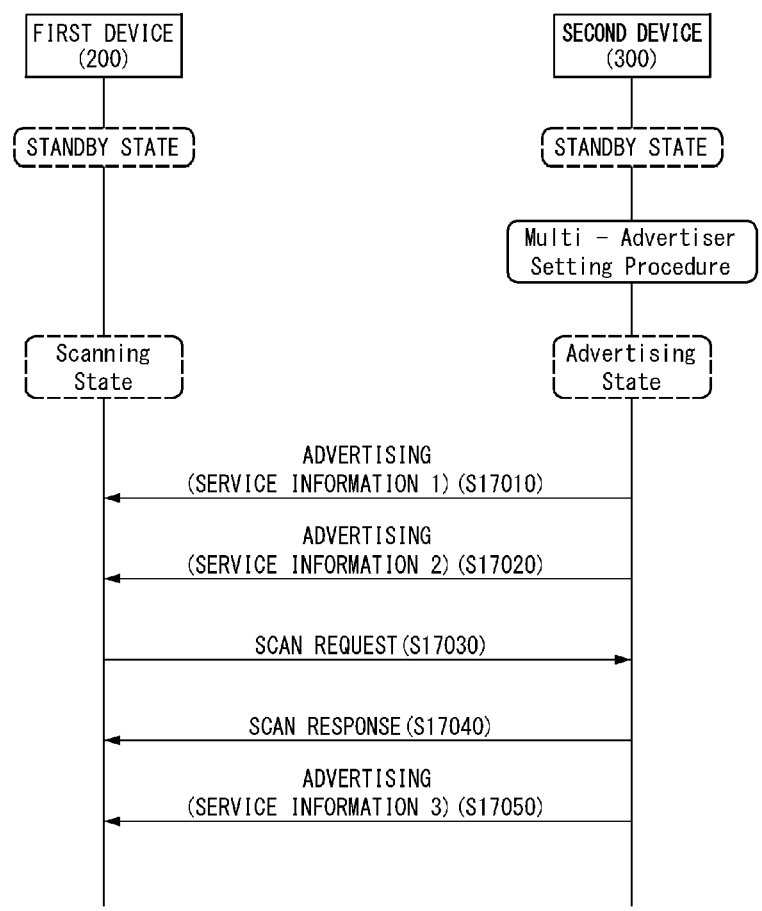
FIG. 17 is a diagram illustrating one example of a method for setting a message including different service information when a service to which the present invention is applied is additionally supported.

FIG. 17 is a diagram illustrating one example of a method for requesting additional information when receiving multiple messages including different service information to which the present invention is applied.

Referring to FIG. 17, when the multiple advertising messages including the different service information are transmitted, the device may request the additional information for the specific service information and receive the additional information.

Specifically, it is assumed that the first device 200 and the second device 300 may be in the standby state and that the second device 300 may provide the multiple services (for example, service 1, service 2, and service 3).

The second device 300 may set the multiple advertising messages including the different service information (service information 1, service information 2, and service information 3) through the "Multi-Advertiser Setting Procedure" described above.

Thereafter, the second device 300 enters the advertising state to transmit an advertising message (first advertising message) including the service information 1 related to the service 1 and the advertising message (second advertising message) including the service information 2 related to the service 2 to the first device 200 (S17010 and S17020).

In this case, when the first device 200 intends to request the additional information (additional information 2) on the service information 2, the first device 200 may transmit the scan request message to the second device 300 (S17030).

The scan request message may include the address of the second device 300 and may be transmitted after step S17020.

The second device 300 that receives the scan request message may transmit the scan response message including the additional information 2 to the first device 200 (S17040).

Thereafter, the second device 300 may transmit the advertising message including the service information 3 that is not transmitted to the first device 200 (S17050).

As described above, after receiving the service information to receive the additional information, the first device 200 transmits a message for requesting the additional information to receive information which the first device 200 intends to receive, not additional information arbitrarily determined by the second device 300.

In another embodiment of the present invention, when the first device 200 intends to request the additional information for the service information 1, not the additional information (additional information 1) for the service information 2, the first device 200 may transmit the scan request message of the step S1703, which includes a parameter or an identifier indicating the additional information 1.

In this case, the second device 300 may know that the information desired by the first device 200 is the additional information 1 through the parameter or the identifier.

Accordingly, the second device 300 may transmit the scan response message including the service information 1 to the first device 200.

As described above, the first device 200 may receive the additional information which the first device 200 intends to receive by transmitting the scan request message including the parameter or identifier indicating the additional information which the first device 200 intends to receive.

Figure 18:
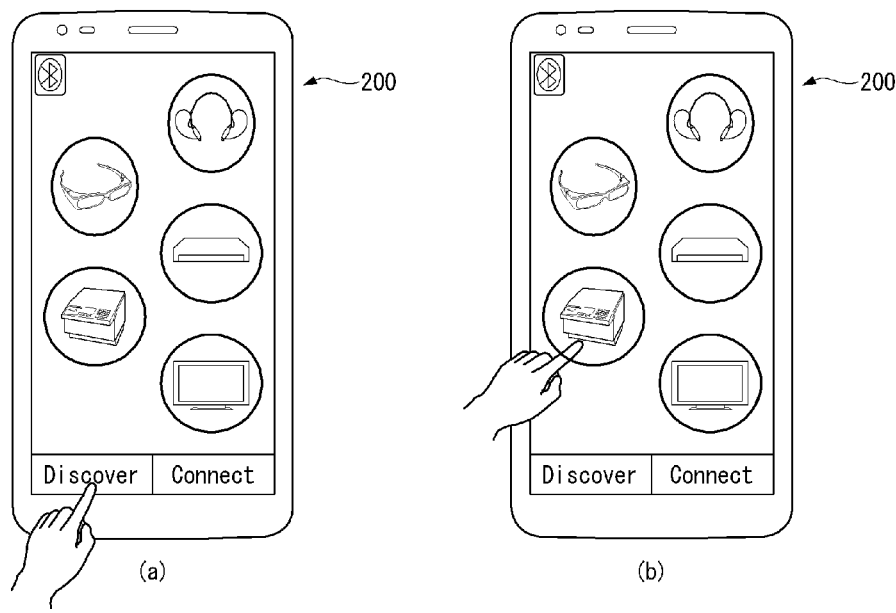
FIG. 18 is a diagram illustrating one example of a method for receiving multiple messages including different service information to which the present invention is applied.
Figure 18:
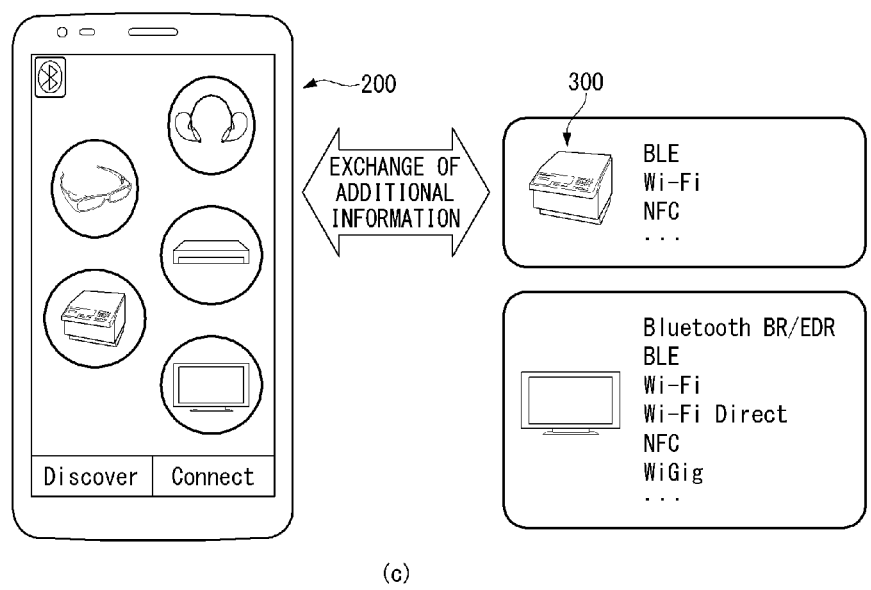

FIG. 18 above is a diagram illustrating a user case of the method described in FIG. 17 to which the present invention is applied.

Referring to FIG. 18, when the multiple advertising messages including the different service information are received, the additional information for the specific service information may be requested and received.

Specifically, (a) the first device 200 may scan the neighboring devices through the advertising messages transmitted from the neighboring devices and show basic information (e.g., a device name, an image, etc.) of the scanned devices to a user through an output unit.

In this case, the first device 200 may scan the neighboring devices when the user instructs the scanning through a scan button.

(b) When the first device 200 intends to acquire the additional information after scanning the neighboring devices, the user may instruct the device to acquire the additional information of the second device 300 through a user action such as clicking the corresponding device.

(c) The first device 200 receiving a command to acquire the additional information from the user may acquire the additional information from the second device 300 through the method illustrated in FIG. 17.

In yet another embodiment of the present invention, even when there is no input from the user in (b) and (c) above, the first device 200 may acquire the additional information of the second device 300 through the method described in FIG. 17 through direct determination.

Figure 19:
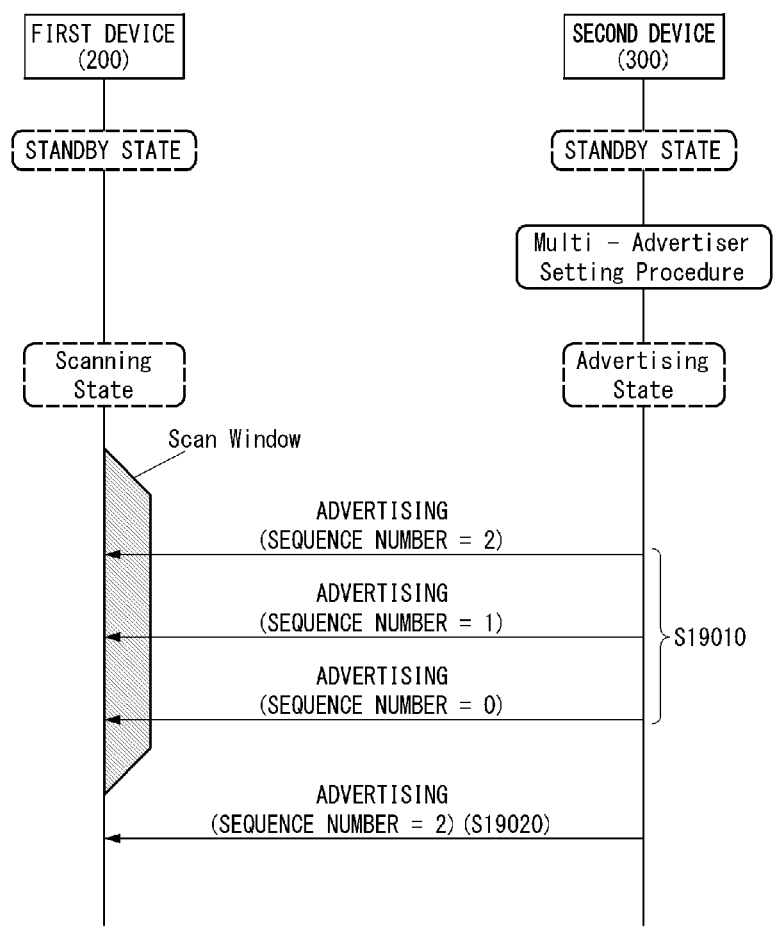
FIG. 19 is a diagram illustrating one example of a method for requesting additional information when receiving multiple messages including different service information to which the present invention is applied.

FIG. 19 is a diagram illustrating another example of the method for receiving multiple messages including different service information to which the present invention is applied.

Referring to FIG. 19, the first device 200 may determine whether all the service information is transmitted from the second device 300 through the information included in the multiple advertising messages including the different service information.

Specifically, it is assumed that the first device 200 and the second device 300 may exist in the standby state and the second device 300 may provide the multiple services (service 1, service 2, and service 3).

The second device 300 may set each of the advertising message including the service information 1 related to the service 1, the advertising message including the service information 2 related to the service 2, and the advertising message including the service information related to the service 3 through the "Multi-Advertiser Setting Procedure".

Thereafter, the second device 300 may transmit the set multiple advertising messages to the neighboring devices by entering the advertising state (S19010).

In this case, each of the advertising messages may include a sequence number indicating a transmission order. For example, the advertising message including the service information 1 may include sequence number 0, the advertising message including the service information 2 may include sequence number 1, and the advertising message including the service information 3 may include sequence number 2.

The first device 200 may set the scanning state through the method described in FIG. 16 and receive advertising messages transmitted by the second device 300 by entering the scanning state.

The advertising messages may include the same parameters as the multiple advertising messages described in FIG. 13.

The first device 200 may check the number of advertising messages to be transmitted by the second device 300 through the "Number of Advertising Entity" included in the advertising messages.

In addition, the first device 200 may check how many advertising messages are transmitted through the sequence number included in each of the multiple advertising messages and determine whether all of the service information related to the multiple services provided by the second device 300 is received.

That is, when all of the advertising messages including the sequence numbers 0, 1, and 2 are received, the first device 200 may determine that all the service information related to the multiple services provided by the second device 300 is received and continuously perform scanning through the scan window until all of the service information is received.

The first device 200 which determines that all of the information related to the multiple services is received through the sequence numbers may terminate the scan window without performing the canning any more and thereafter, may not receive the advertising message transmitted from the second device 300 (S19020).

Through such a method, the device may determine the number of the types of the advertising messages to be transmitted and whether all types of advertising messages are received and continuously perform the scanning.

Figure 20:
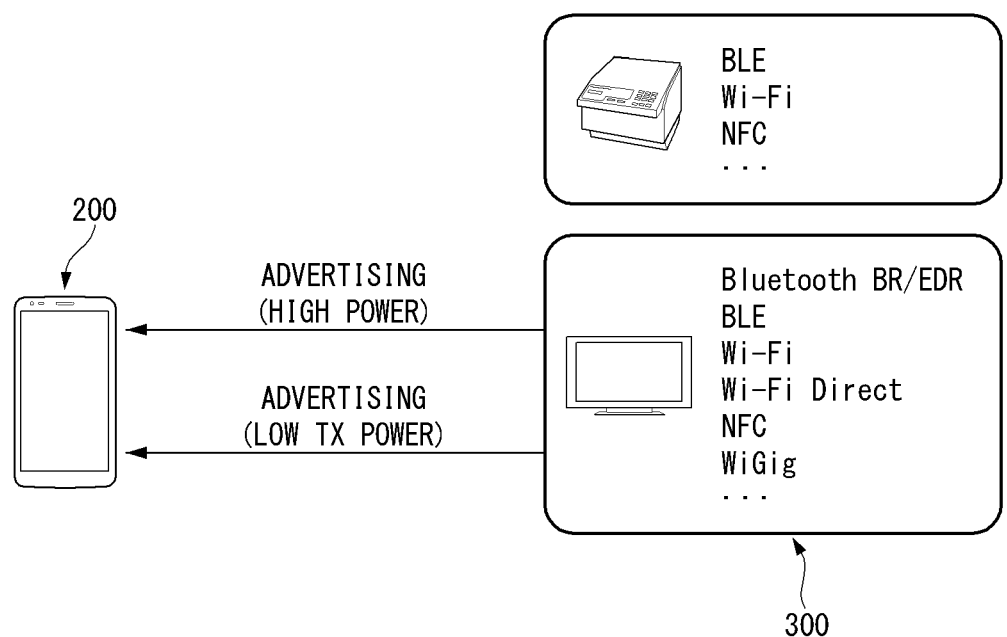
FIG. 20 is a diagram illustrating another example of a method for requesting additional information when receiving multiple messages including different service information to which the present invention is applied.

FIG. 20 is a diagram illustrating yet another example of a method for setting and transmitting multiple messages including different service information to which the present invention is applied.

Referring to FIG. 20, when the advertising message is set through the "Multi-Advertiser Setting Procedure", the advertising message including a parameter indicating transmission power may be transmitted.

Specifically, the second device 300 may set the multiple advertising messages including the different service information through the "Multi-Advertiser Setting Procedure" and make the parameters indicating the respective transmission powers be included in the multiple advertising messages.

In this case, the transmission power may be set differently according to the type of the service included in the service information.

For example, in the services provided by the second device, distances to use the services may be different from each other according to characteristics of the respective services. In this case, the second device 300 may transmit the advertising message including the service information (service information 1) related to the service (service 1) usable in a short distance with low transmission power and transmit the advertising message including the service information (service information 2) related to the service (service 2) with higher transmission power.

The first device 200 may receive both the advertising message including the service information 1 and the advertising message including the service information 2 when the first device 200 is at a distance where the service 1 may be used.

However, when the second device 300 is at a distance where the service 2 may be used, the first device 200 may not receive the advertising message including the service information 1.

That is, by transmitting the advertising messages with different transmission power, the second device 300 may enable only devices in a service usable distance to receive the advertising messages.

In addition, the first device 200 may calculate parameters such as the distance to the second device 300, an RSSI, etc. by transmitting the advertising message including the transmission power of each of the advertising messages.

Further, when the transmission power is included in the header of the advertising message, the controller of the first device 200 may check the transmission power in spite of not transmitting the advertising message received by the host of the first device 200, thereby reducing the power consumption by reducing the operation of the host.

Configurations and methods of the described embodiments may not be limitedly applied to the aforementioned present invention, but all or some of the respective embodiments may be selectively combined and configured so as to be variously modified.

Further, the present invention is not limited to the aforementioned embodiments and the accompanying drawings, and it will be obvious to those skilled in the technical field to which the present invention pertains that various substitutions, modifications, and changes may be made within the scope without departing from the technical spirit of the present invention.

INDUSTRIAL APPLICABILITY

The present invention relates to Bluetooth data transmission/reception, and particularly, to a method and an apparatus for transmitting and receiving a message by setting an advertising message by using Bluetooth low energy (LE) technology.

The invention claimed is:

1. A method for setting advertising messages by a device in Bluetooth low energy (LE), the method comprising:
transmitting, by a host of the device, to a controller of the device a first parameter setting command for setting parameters included in two or more advertising messages;

wherein each of the two or more advertising messages is set differently based on the parameters, and wherein the parameters include a transmission power of each of the two or more advertising messages;

transmitting, by the host, to the controller a first data setting command for setting first data included in the two or more advertising messages; and transmitting, by the host, to the controller a first instruction command instructing transmission of the two or more advertising messages.

2. The method of claim 1, wherein at least one of the parameters includes at least one of the number of multiple services, a transmission interval of each of the two or more advertising messages, a scan window size for scanning the two or more advertising messages, or a sequence number indicating a transmission order of the two or more advertising messages.

3. The method of claim 2, further comprising:
transmitting, by the controller, the two or more advertising messages to neighboring devices according to the transmission interval;
receiving, by the controller, a request message requesting additional information for a specific service from one of the neighboring devices,
wherein the request message includes an indicator indicating the one of the neighboring devices requests the additional information for the specific service; and
transmitting, by the controller, a response message including the additonal information to the one of the neighboring devices based oin the indicator.

4. The method of claim 1, wherein the two or more advertising messages include at least one of a transmission interval, a scan window size, or a sequence number of each of the two or more advertising messages which are set by the host.

5. The method of claim 1, further comprising:
transmitting a second parameter setting command for setting parameters of multiple advertising messages related to a specific service and multiple services when the device additionally supports the specific device;
receiving, in response to the second parameter setting command, from the controller, a third completion command indicating that the setting of the parameters is completed;
transmitting, by the host, to the controller a second data setting command for setting second data included in the multiple advertising messages;
receiving, in response to the second data setting command, from the controller, a fourth completion command indicating that the setting of the second data has been completed; and
transmitting, by the host, to the controller a second instruction command instructing transmission of the multiple advertising messages,
wherein the second data includes service information indicating one service among multiple services and the specific service, and wherein each of the multiple advertising messages includes different service information.

6. The method of claim 1, wherein the two or more advertising messages further include indication information indicative of an advertisement message including additional information related with the service information.

7. The method of claim 6, wherein the indication information includes at least one of channel information in which the advertising message is transmitted or an identifier indicating the advertising message.

8. A method for transmitting and receiving data to and from a second device by a first device in Bluetooth low energy (LE), the method comprising:
receiving a first advertising message including first service information of a first service from the second device;
receiving a second advertising message including second service information of a second service from the second device,
wherein the first service is different from the second service;
transmitting a request message for requesting addition information for the second service information to the second device,
wherein the request message includes an indicator indicating the first device requests the additional information for the second service; and
receiving a response message including the additional information in response to the request message,
wherein the additional information is selected by the second device based on the indicator, and
wherein the first advertising message and the second advertising message are set through one advertising message setting procedure.

9. A device for setting advertising messages in Bluetooth low energy (LE), the device comprising:
a communication unit configured to communicate with the outside in a wireless or wired manner;
a memory configured to store data; and
a processor functionally connected with the communication unit,
wherein the processor is configured to:
transmit, by a host of the device, to a controller of the device a first parameter setting command for setting parameters included in two or more advertising messages,
wherein each of the two or more advertising messages is set differently based on the parameters, and
wherein the parameters include a transmission power of each of the two or more advertising messages,
transmit, by the host, to the controller a first data setting command for setting first data included in the two or more advertising messages, and
transmit, by the host, to the controller a first instruction command instructing transmission of the two or more advertising messages.

* * * * *